(12) United States Patent
Ren et al.

(10) Patent No.: US 12,555,738 B2
(45) Date of Patent: Feb. 17, 2026

(54) SYSTEMS AND METHODS FOR SIGNAL ELECTRON DETECTION

(71) Applicant: ASML Netherlands B.V., Veldhoven (NL)

(72) Inventors: Weiming Ren, San Jose, CA (US); Yongxin Wang, San Ramon, CA (US)

(73) Assignee: ASML Netherlands B.V., Veldhoven (NL)

( * ) Notice: Subject to any disclaimer, the term of this patent is extended or adjusted under 35 U.S.C. 154(b) by 611 days.

(21) Appl. No.: 17/910,752

(22) PCT Filed: Mar. 9, 2021

(86) PCT No.: PCT/EP2021/055956
§ 371 (c)(1),
(2) Date: Sep. 9, 2022

(87) PCT Pub. No.: WO2021/180745
PCT Pub. Date: Sep. 16, 2021

(65) Prior Publication Data
US 2023/0112447 A1 Apr. 13, 2023

Related U.S. Application Data

(60) Provisional application No. 62/988,282, filed on Mar. 11, 2020.

(51) Int. Cl.
*H01J 37/244* (2006.01)
*G01N 23/203* (2006.01)
(Continued)

(52) U.S. Cl.
CPC .......... *H01J 37/244* (2013.01); *G01N 23/203* (2013.01); *G01N 23/2206* (2013.01);
(Continued)

(58) Field of Classification Search
CPC ...... H01J 37/244; H01J 37/10; H01J 37/1472; H01J 2237/24475; H01J 2237/2448;
(Continued)

(56) References Cited

U.S. PATENT DOCUMENTS

| 2 A | * | 7/1836 | Goulding | D01G 21/00 57/58.49 |
|---|---|---|---|---|
| 4,728,790 A | | 3/1988 | Piles | |

(Continued)

FOREIGN PATENT DOCUMENTS

| JP | S61288357 A | 12/1986 |
|---|---|---|
| JP | 2000299078 A | 10/2000 |

(Continued)

OTHER PUBLICATIONS

Office Action of the Intellectual Property Office issued in related Taiwanese Patent Application No. 110108249; mailed Feb. 9, 2022 (13 pgs.).

(Continued)

*Primary Examiner* — David A Vanore
(74) *Attorney, Agent, or Firm* — Finnegan, Henderson, Farabow, Garrett & Dunner, LLP

(57) ABSTRACT

Systems and methods of observing a sample using an electron beam apparatus are disclosed. The electron beam apparatus comprises an electron source configured to generate a primary electron beam along a primary optical axis, and a first electron detector having a first detection layer substantially parallel to the primary optical axis and configured to detect a first portion of a plurality of signal electrons generated from a probe spot on a sample. The method may comprise generating a plurality of signal electrons and detecting the signal electrons using the first electron detector substantially parallel to the primary optical axis of the primary electron beam. A method of configuring an electro- (Continued)

static element or a magnetic element to detect backscattered electrons may include disposing an electron detector on an inner surface of the electrostatic or magnetic element and depositing a conducting layer on the inner surface of the electron detector.

26 Claims, 13 Drawing Sheets

(51) Int. Cl.
*G01N 23/2206* (2018.01)
*G01N 23/2251* (2018.01)
*H01J 37/10* (2006.01)
*H01J 37/147* (2006.01)

(52) U.S. Cl.
CPC .......... *G01N 23/2251* (2013.01); *H01J 37/10* (2013.01); *H01J 37/1472* (2013.01); *G01N 2223/045* (2013.01); *G01N 2223/053* (2013.01); *G01N 2223/07* (2013.01); *G01N 2223/507* (2013.01); *H01J 2237/24475* (2013.01); *H01J 2237/2448* (2013.01)

(58) Field of Classification Search
CPC ............ H01J 37/04; H01J 2237/24465; G01N 23/203; G01N 23/2206; G01N 23/2251; G01N 2223/045; G01N 2223/053; G01N 2223/07; G01N 2223/507
See application file for complete search history.

(56) References Cited

U.S. PATENT DOCUMENTS

| | | | | |
|---|---|---|---|---|
| 4,962,306 | A * | 10/1990 | Hodgson | H01J 37/244 250/311 |
| 6,710,340 | B2 * | 3/2004 | Kazumori | H01J 37/244 250/396 ML |
| 7,105,814 | B2 * | 9/2006 | Knippelmeyer | H01J 37/244 250/307 |
| 7,928,383 | B2 * | 4/2011 | Wang | H01J 37/244 250/397 |
| 8,203,119 | B2 * | 6/2012 | Degenhardt | H01J 37/244 250/311 |
| 8,618,480 | B2 | 12/2013 | Ren et al. | |
| 10,103,002 | B1 * | 10/2018 | Gamm | H01J 37/1474 |
| 10,121,632 | B2 * | 11/2018 | Okai | H01J 37/20 |
| 11,594,396 | B2 * | 2/2023 | Ren | H01J 37/09 |
| 12,196,692 | B2 * | 1/2025 | Ren | H01J 37/266 |
| 2004/0245465 | A1 * | 12/2004 | Steigerwald | H01J 37/244 250/310 |
| 2005/0139789 | A1 * | 6/2005 | Nagano | H01J 37/244 250/492.23 |
| 2009/0101817 | A1 | 4/2009 | Ohshima et al. | |
| 2012/0025074 | A1 * | 2/2012 | Barbi | G01T 1/20188 250/361 R |
| 2013/0032713 | A1 * | 2/2013 | Barbi | G01T 1/20188 250/311 |
| 2013/0277554 | A1 * | 10/2013 | Ren | H01J 37/261 250/310 |
| 2014/0361167 | A1 * | 12/2014 | Morishita | H01J 37/28 250/310 |
| 2015/0014527 | A1 * | 1/2015 | Otsuka | H01J 37/244 250/307 |
| 2016/0284505 | A1 * | 9/2016 | Ren | H01J 37/28 |
| 2017/0025241 | A1 * | 1/2017 | Li | H01J 37/10 |
| 2017/0025243 | A1 * | 1/2017 | Ren | H01J 37/1477 |
| 2018/0033589 | A1 * | 2/2018 | Schamber | H01J 37/20 |
| 2018/0204706 | A1 * | 7/2018 | Kishimoto | H01J 37/21 |
| 2019/0088440 | A1 * | 3/2019 | Zeidler | H01J 37/09 |
| 2019/0355552 | A1 * | 11/2019 | Mizutani | H01J 37/1474 |
| 2021/0193437 | A1 * | 6/2021 | Ren | H01J 37/153 |
| 2021/0319977 | A1 * | 10/2021 | Liu | H01J 37/1474 |
| 2022/0037112 | A1 * | 2/2022 | Tani | H01J 37/28 |
| 2023/0112447 | A1 * | 4/2023 | Ren | G01N 23/203 250/307 |
| 2024/0128051 | A1 * | 4/2024 | Zeidler | H01J 37/244 |

FOREIGN PATENT DOCUMENTS

| | | |
|---|---|---|
| JP | 2002324510 A | 11/2002 |
| JP | 2005004995 A | 1/2005 |
| JP | 2005129345 A | 5/2005 |
| JP | 2007149568 A | 6/2007 |
| JP | 2009099468 A | 5/2009 |
| JP | 2013033671 A | 2/2013 |
| JP | 2013058314 A | 3/2013 |
| JP | 2020-24912 A | 2/2020 |
| TW | 201511064 A | 3/2015 |
| TW | 201923340 A | 6/2019 |
| WO | WO 2018/173242 A1 | 9/2018 |

OTHER PUBLICATIONS

Liu, Xuedong. et al, Low energy large scan field electron beam column for wafer inspection, Journal of Vacuum Science & Technology B: Microelectronics and Nanometer Structures Processing, Measurement, and Phenomena 22, 3534 (2004); doi: 10.1116/1.1827629.

* cited by examiner

SYSTEMS AND METHODS FOR SIGNAL ELECTRON DETECTION

CROSS-REFERENCE TO RELATED APPLICATIONS

This application claims priority to International Application No. PCT/EP2021/055956, filed Mar. 9, 2021, and published as WO 2021/180745 A1, which claims priority of U.S. application 62/988,282 which was filed on Mar. 11, 2020. The contents of these applications are incorporated herein by reference in their entireties.

TECHNICAL FIELD

The embodiments provided herein disclose a charged-particle beam apparatus, and more particularly systems and methods for enhancing signal electron collection efficiency in an electron microscope.

BACKGROUND

In manufacturing processes of integrated circuits (ICs), unfinished or finished circuit components are inspected to ensure that they are manufactured according to design and are free of defects. Inspection systems utilizing optical microscopes or charged particle (e.g., electron) beam microscopes, such as a scanning electron microscope (SEM) can be employed. As the physical sizes of IC components continue to shrink, accuracy and yield in defect detection and inspection become more important. Although multiple electron detectors may be used to maximize collection of secondary and backscattered electrons separately, the aberrations of the objective lens assembly and undesirable shielding of signal electrons may limit the overall imaging resolution and detection efficiency, rendering the inspection tools inadequate for their desired purpose.

SUMMARY

One aspect of the present disclosure is directed to an electron beam apparatus comprising an electron source configured to generate a primary electron beam along a primary optical axis, and a first electron detector having a first detection layer substantially parallel to the primary optical axis and configured to detect a first portion of a plurality of signal electrons generated from a probe spot on a sample. The apparatus may further comprise a second electron detector configured to detect a second portion of the plurality of signal electrons, wherein a second detection layer of the second electron detector is substantially perpendicular to the primary optical axis. The apparatus may further comprise an objective lens configured to focus the primary electron beam on the sample, focus the first portion of the plurality of signal electrons on the first detection layer of the first electron detector, and focus the second portion of the plurality of signal electrons on the second detection layer of the second electron detector. The first electron detector may comprise a secondary electron detector, a backscattered electron detector, an electrostatic element, or a magnetic element disposed between the sample and the second electron detector. The first electron detector may be disposed between the sample and the second electron detector, and may be disposed along the primary optical axis. The first and the second electron detectors may be configured to detect the plurality of signal electrons generated from the probe spot on the sample. An inner surface of the electrostatic element or a magnetic element may be configured to facilitate detection of the first portion of the plurality of signal electrons. The electrostatic element may comprise a beam deflector or a beam booster, and the magnetic element may comprise a beam separator. The inner surface of the beam deflector may comprise a continuous detection layer or a segmented detection layer, wherein the segmented detection layer of the beam deflector may comprise a plurality of detector segments arranged linearly, radially, circumferentially, or azimuthally along the primary optical axis. The beam deflector may comprise a multipole structure, and an inner surface of a pole of the multipole structure may be configured to facilitate detection of the first portion of the plurality of signal electrons. The beam booster may comprise an inner surface configured to facilitate detection of the first portion of the plurality of signal electrons, and wherein the inner surface of the beam booster may comprise a continuous detection layer or a segmented detection layer. The segmented detection layer of the beam booster may comprise a plurality of detector segments arranged linearly, radially, circumferentially, or azimuthally along the primary optical axis. The beam separator may comprise an inner surface configured to facilitate detection of the first portion of the plurality of signal electrons. The first electron detector may comprise a monolithic electron detector or a segmented electron detector, wherein the segmented electron detector comprises a plurality of detector segments arranged linearly, radially, circumferentially, or azimuthally along the primary optical axis. The first electron detector may comprise a plurality of electrostatic elements or magnetic elements configured to facilitate detection of the plurality of signal electrons based on a characteristic of a signal electron of the plurality of signal electrons, wherein the characteristic of the signal electron may comprise an emission energy, an emission polar angle, or an emission azimuth angle with reference to the primary optical axis. The first portion of the plurality of signal electrons may comprise backscattered electrons, and wherein the emission polar angle of the backscattered electrons is in a range of 15° to 65°. The plurality of signal electrons may comprise secondary electrons, backscattered electrons, or auger electrons.

One aspect of the present disclosure is directed to a charged-particle beam apparatus comprising an charged-particle source configured to generate a primary charged-particle beam along a primary optical axis, and a first charged-particle detector having a first detection layer substantially parallel to the primary optical axis and configured to detect a first portion of a plurality of signal charged-particles generated from a probe spot on a sample. The apparatus may further comprise a second charged-particle detector configured to detect a second portion of the plurality of signal charged-particles, wherein a second detection layer of the second electron detector is substantially perpendicular to the primary optical axis. The apparatus may further comprise an objective lens configured to focus the primary charged-particle beam on the sample, focus the first portion of the plurality of signal charged-particles on the first detection layer of the first charged-particle detector, and focus the second portion of the plurality of signal charged-particles on the second detection layer of the second charged-particle detector. The first charged-particle detector may comprise a secondary electron detector, a backscattered electron detector, an electrostatic element, or a magnetic element disposed between the sample and the second charged-particle detector. The first charged-particle detector may be disposed between the sample and the second charged-particle detector, and may be disposed along the primary optical axis. The first and the second charged-particle detectors may be configured to detect the plurality of signal charged-particles generated from the probe spot on the sample. An inner surface of the electrostatic element or a magnetic element may be configured to facilitate detection of the first portion of the plurality of signal charged-particles. The electrostatic element may comprise a beam deflector or a beam booster, and the magnetic element may comprise a beam separator. The inner surface of the beam deflector may comprise a continuous detection layer or a segmented detection layer, wherein the segmented detection layer of the beam deflector may comprise a plurality of detector segments arranged linearly, radially, circumferentially, or azimuthally along the primary optical axis. The beam deflector may comprise a multipole structure, and an inner surface of a pole of the multipole structure may be configured to facilitate detection of the first portion of the plurality of signal charged-particles. The beam booster may comprise an inner surface configured to facilitate detection of the first portion of the plurality of signal charged-particles, and wherein the inner surface of the beam booster may comprise a continuous detection layer or a segmented detection layer. The segmented detection layer of the beam booster may comprise a plurality of detector segments arranged linearly, radially, circumferentially, or azimuthally along the primary optical axis. The beam separator may comprise an inner surface configured to facilitate detection of the first portion of the plurality of signal charged-particles. The first charged-particle detector may comprise a monolithic electron detector or a segmented electron detector, wherein the segmented electron detector comprises a plurality of detector segments arranged linearly, radially, circumferentially, or azimuthally along the primary optical axis. The first electron detector may comprise a plurality of electrostatic elements or magnetic elements configured to facilitate detection of the plurality of signal charged-particles based on a characteristic of a signal charged-particle of the plurality of signal charged-particles, wherein the characteristic of the signal charged-particle may comprise an emission energy, an emission polar angle, or an emission azimuth angle with reference to the primary optical axis. The first portion of the plurality of signal charged-particles may comprise backscattered electrons, and wherein the emission polar angle of the backscattered electrons is in a range of 15° to 65°. The plurality of signal charged-particles may comprise secondary electrons, backscattered electrons, or auger electrons.

Another aspect of the present disclosure is directed to an electron beam apparatus comprising an element. The element may comprise a first electron detector having a first detection layer disposed on an inner surface of the element and configured to detect a first portion of a plurality of signal electrons generated after interaction of a primary electron beam with a sample, and an electrically conducting layer deposited on a portion of an inner surface of the first electron detector and configured to deflect the primary electron beam on the sample, wherein the first electron detector comprises a diode, a scintillator, a radiation detector, a solid-state detector, or a p-i-n junction diode, and wherein the electrically conducting layer comprises a metal film, a semiconductor film, or an electrode. The apparatus may further comprise a controller having circuitry configured to apply a voltage signal to the electrically conducting layer to deflect the primary electron beam; and receive a detection signal generated by the first electron detector in response to the plurality of signal electrons being detected, wherein the detection signal comprises an electrical signal, an optical signal, a mechanical signal, or a combination thereof. The applied voltage signal may comprise a scan deflection voltage configured to scan the primary electron beam along an X-axis, a Y-axis, or both. The circuitry may comprise a readout circuit configured to communicate data associated with the detection signal to a processor of the electron beam apparatus. The first electron detector may comprise a plurality of segments of a segmented electron detector, and the plurality of segments may be arranged linearly, circumferentially, radially, or azimuthally along a primary optical axis of the primary electron beam. The circuitry may be further configured to individually apply the scan deflection voltage to the electrically conducting layer of a segment of the segmented electron detector and receive a corresponding detection signal. The apparatus may further comprise a second electron detector having a second detection layer and configured to detect a second portion of the plurality of signal electrons, wherein the detection layer is substantially perpendicular to the primary optical axis. The apparatus may further comprise an objective lens configured to focus the primary electron beam on the sample, focus the first portion of the plurality of signal electrons on the first detection layer of the first electron detector, and focus the second portion of the plurality of signal electrons on the second detection layer of the second electron detector. The element may be disposed between the sample and the second electron detector. The first and the second electron detectors may be configured to detect the plurality of signal electrons based on a characteristic of a signal electron of the plurality of signal electrons, wherein the characteristic of the signal electron comprises an emission energy, an emission polar angle, or an emission azimuth angle with reference to the primary optical axis. The first portion of the plurality of signal electrons may comprise backscattered electrons, and wherein the emission polar angle of the backscattered electrons is in a range of 15° to 65°. The plurality of signal electrons may comprise secondary electrons, backscattered electrons, or auger electrons. The element may comprise an electrostatic element or a magnetic element. The electrostatic element may comprise a beam deflector or a beam booster, and the magnetic element may comprise a beam separator. The beam deflector may comprise an inner surface configured to facilitate detection of the first portion of the plurality of signal electrons, wherein the inner surface of the beam scanning deflector comprises a continuous detection layer or a segmented detection layer. The segmented detection layer of the beam deflector may comprise a plurality of detector segments arranged linearly, radially, circumferentially, or azimuthally along the primary optical axis. The beam deflector may comprise a multipole structure, and an inner surface of a pole of the multipole structure may be configured to facilitate detection of the first portion of the plurality of signal electrons. The beam booster may comprise an inner surface configured to detect the first portion of the plurality of signal electrons, wherein the inner surface of the beam booster comprises a continuous detection layer or a segmented detection layer. The segmented detection layer of the beam booster may comprise a plurality of detector segments arranged linearly, radially, circumferentially, or azimuthally along the primary optical axis. The beam separator may comprise an inner surface configured to facilitate detection of the first portion of the plurality of signal electrons.

Another aspect of the present disclosure is directed to an element of an electron beam apparatus. The element may comprise a first electron detector having a first detection layer substantially parallel to a primary optical axis and configured to detect a first portion of a plurality of signal electrons generated after interaction of a primary electron beam with a sample; and an electrically conducting layer disposed on a portion of the first detection layer of the first electron and configured to deflect the primary electron beam incident on the sample. The first charged-particle detector may comprise a diode, a scintillator, a radiation detector, a solid-state detector, or a p-i-n junction diode. The electrically conducting layer may comprise a metal film, a doped semiconductor film, or an electrode. The element may be in electrical communication with a controller wherein the electrically conducting layer is applied a voltage signal from the controller to enable deflection of the primary electron beam; and a detection signal generated by the first electron detector in response to detection of the plurality of signal electrons. The detection signal may comprise an electrical signal, an optical signal, a mechanical signal, or a combination thereof. The applied voltage signal may comprise a scan deflection voltage configured to scan the primary electron beam along an X-axis, a Y-axis, or both. The first electron detector may comprise a plurality of segments of a segmented electron detector, wherein the plurality of segments may be arranged linearly, circumferentially, radially, or azimuthally along a primary optical axis of the primary electron beam. The controller may be further configured to individually apply the scan deflection voltage to the electrically conducting layer of a segment of the segmented electron detector. The first electron detector may be disposed on an inner surface of the element. The element may comprise an electrostatic element or a magnetic element. The electrostatic element may comprise a beam deflector or a beam booster, and the magnetic element may comprise a beam separator. The electrostatic element may comprise a beam deflector, wherein the beam deflector comprises an inner surface configured to facilitate detection of the first portion of the plurality of signal electrons. The beam deflector may comprise an inner surface configured to facilitate detection of the first portion of the plurality of signal electrons, wherein the inner surface of the beam scanning deflector comprises a continuous detection layer or a segmented detection layer. The segmented detection layer of the beam deflector may comprise a plurality of detector segments arranged linearly, radially, circumferentially, or azimuthally along the primary optical axis. The beam deflector may comprise a multipole structure, and an inner surface of a pole of the multipole structure may be configured to facilitate detection of the first portion of the plurality of signal electrons. The beam booster may comprise an inner surface configured to detect the first portion of the plurality of signal electrons, wherein the inner surface of the beam booster comprises a continuous detection layer or a segmented detection layer. The segmented detection layer of the beam booster may comprise a plurality of detector segments arranged linearly, radially, circumferentially, or azimuthally along the primary optical axis. The beam separator may comprise an inner surface configured to facilitate detection of the first portion of the plurality of signal electrons.

Another aspect of the present disclosure is directed to a method performed by an electron beam apparatus for observing a sample. The method may comprise generating a plurality of signal electrons from a probe spot on the sample after interaction with a primary electron beam; and detecting a first portion of the plurality of signal electrons using a first electron detector comprising a first detection layer substantially parallel to a primary optical axis of the primary electron beam. The method may further comprise detecting, using a second electron detector, a second portion of the plurality of signal electrons, wherein a second detection layer of the second electron detector is substantially perpendicular to the primary optical axis. The first electron detector may comprise a secondary electron detector, a backscattered electron detector, an electrostatic element or a magnetic element. In this method, the first electron detector may be disposed between the sample and the second electron detector along the primary optical axis. The method may include detecting the plurality of signal electrons based on a characteristic of a signal electron of the plurality of signal electrons, wherein the characteristic of the signal electron may comprise an emission energy, an emission polar angle, or an emission azimuth angle of the signal electron with reference to the primary optical axis. The first portion of the plurality of signal electrons may comprise backscattered electrons, and wherein the emission polar angle of the backscattered electrons is in a range of 15° to 65°. The electrostatic element may comprise a beam deflector, or a beam booster, and a magnetic element may comprise a beam separator. The method may further comprise configuring an inner surface of the electrostatic element to facilitate detection of the first portion of the plurality of signal electrons, or an inner surface of the beam scanning deflector to detect the first portion of the plurality of signal electrons. The inner surface of the beam scanning deflector may comprise a continuous detection layer or a segmented detection layer. The segmented detection layer of the beam scanning deflector may comprise a plurality of detector segments arranged linearly, radially, circumferentially, or azimuthally along the primary optical axis. The method may comprise configuring an inner surface of a pole of the beam deflector to facilitate detection of the first portion of the plurality of signal electrons. The method may further comprise configuring an inner surface of the beam booster to detect the first portion of the plurality of signal electrons, or configuring an inner surface of the beam separator to facilitate detection of the first portion of the plurality of signal electrons.

Another aspect of the present disclosure is directed to a method of configuring an element of an electron beam apparatus. The method may comprise disposing a first electron detector on an inner surface of the element, the first electron detector having a first detection layer configured to detect a first portion of a plurality of signal electrons generated after interaction of a primary electron beam with a sample; and depositing an electrically conducting layer on a portion of an inner surface of the first electron detector, the electrically conducting layer configured to deflect the primary electron beam on the sample. The method may further comprise disposing a segmented electron detector comprising a plurality of segments, and wherein the plurality of segments are arranged linearly, circumferentially, radially, or azimuthally along a primary optical axis of the primary electron beam. Disposing the first electron detector may comprise forming the first electron detector using a technique comprising micro-electromechanical system (MEMS) fabrication, semiconductor fabrication, or mechanical coupling. Depositing the electrically conducting layer may be performed using a technique comprising bonding, gluing, soldering, physical vapor deposition, or chemical vapor deposition. The electrically conducting layer may comprise a metal film, a semiconductor film, or an electrode. The method may further comprise electrically connecting the element with a controller configured to apply a voltage signal to the electrically conducting layer to enable deflection of the primary electron beam; and receive a detection signal generated by the electron detector in response to the plurality of signal electrons being detected. Applying the voltage signal may comprise applying a scan deflection voltage signal configured to scan the primary electron beam along an X-axis, a Y-axis, or both. Detecting the first portion of the plurality of signal electrons may be based on a characteristic of a signal electron of the plurality of signal electrons, the characteristic of the signal electron comprising an emission energy, an emission polar angle, or an emission azimuth angle with reference to the primary optical axis. The method may further comprise disposing the first electron detector such that the first detection layer of the first electron detector is placed substantially parallel to the primary optical axis.

Another aspect of the present disclosure is directed to a non-transitory computer readable medium storing a set of instructions that is executable by one or more processors of an electron beam apparatus to cause the electron beam apparatus to perform a method of observing a sample, the method may comprising generating a plurality of signal electrons from a probe spot on the sample after interaction with a primary electron beam; and detecting a first portion of the plurality of signal electrons using a first electron detector comprising a first detection layer substantially parallel to a primary optical axis of the primary electron beam. The set of instructions may cause the electron beam apparatus to further perform detecting, using a second electron detector, a second portion of the plurality of signal electrons, wherein a second detection layer of the second electron detector is substantially perpendicular to the primary optical axis, and detecting the plurality of signal electrons based on a characteristic of a signal electron of the plurality of signal electrons, the characteristic comprising an emission energy, an emission polar angle, or an emission azimuth angle of the signal electron with reference to the primary optical axis.

Other advantages of the embodiments of the present disclosure will become apparent from the following description taken in conjunction with the accompanying drawings wherein are set forth, by way of illustration and example, certain embodiments of the present invention.

DETAILED DESCRIPTION

Figure 1:
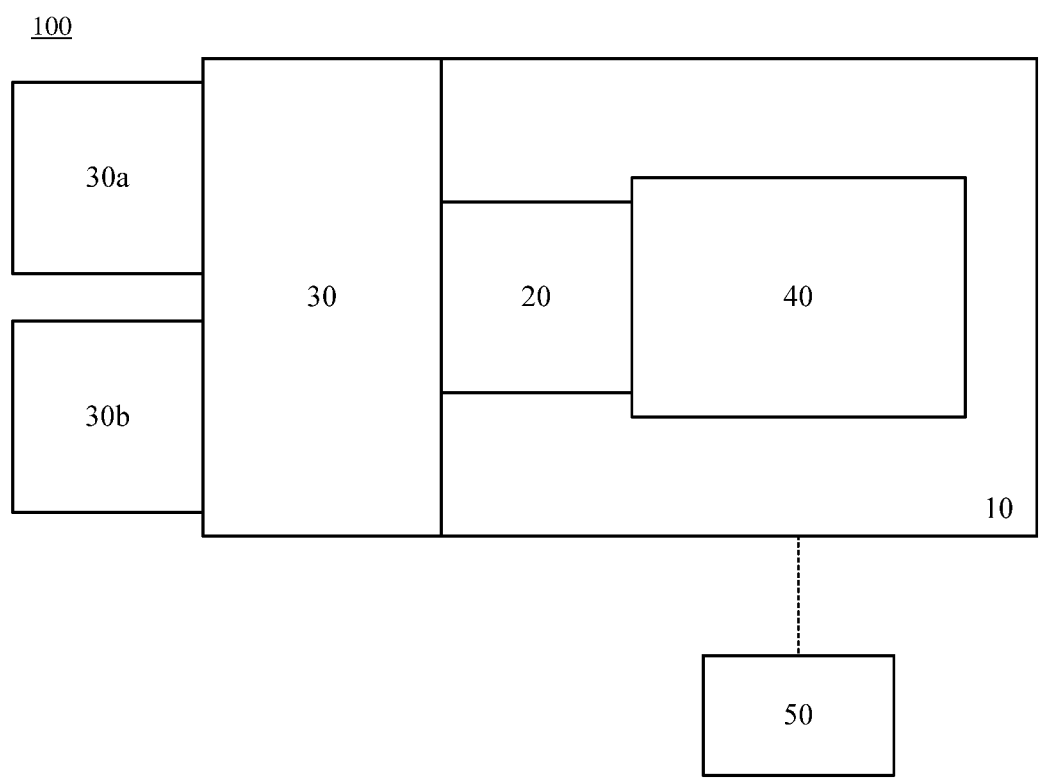
FIG. 1 is a schematic diagram illustrating an exemplary electron beam inspection (EBI) system, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations. Instead, they are merely examples of apparatuses and methods consistent with aspects related to the disclosed embodiments as recited in the appended claims. For example, although some embodiments are described in the context of utilizing electron beams, the disclosure is not so limited. Other types of charged particle beams may be similarly applied. Furthermore, other imaging systems may be used, such as optical imaging, photo detection, x-ray detection, etc.

Electronic devices are constructed of circuits formed on a piece of silicon called a substrate. Many circuits may be formed together on the same piece of silicon and are called integrated circuits or ICs. The size of these circuits has decreased dramatically so that many more of them can fit on the substrate. For example, an IC chip in a smart phone can be as small as a thumbnail and yet may include over 2 billion transistors, the size of each transistor being less than 1/1000th the size of a human hair.

Making these extremely small ICs is a complex, time-consuming, and expensive process, often involving hundreds of individual steps. Errors in even one step have the potential to result in defects in the finished IC, thereby rendering it useless. Thus, one goal of the manufacturing process is to avoid such defects to maximize the number of functional ICs made in the process, that is, to improve the overall yield of the process.

One component of improving yield is monitoring the chip making process to ensure that it is producing a sufficient number of functional integrated circuits. One way to monitor the process is to inspect the chip circuit structures at various stages of their formation. Inspection can be carried out using a scanning electron microscope (SEM). An SEM can be used to image these extremely small structures, in effect, taking a "picture" of the structures. The image can be used to determine if the structure was formed properly and also if it was formed in the proper location. If the structure is defective, then the process can be adjusted so the defect is less likely to recur.

The accuracy and reliability of inspection of high-density IC chips using SEMs may depend on the imaging resolution of the system, among other things. One of the several ways to obtain and maintain high imaging resolution is to maximize the collection efficiency of signal electrons, such as secondary electrons (SE) and backscattered electrons (BSEs). When a primary electron strikes the surface of a sample, it interacts with a volume of the sample based on the landing energy, sample material, and spot size, among other things, and generates a plurality of signal electrons. SEs, which result from inelastic interactions between the electron beam and the sample, have lower energies and originate from the surface or the near-surface region of a sample. BSEs, which result from an elastic collision of an electron of the electron beam with an atom, have higher energies and often originate from deeper areas within the interaction volume, and thus provide information associated with composition and distribution of a material. Therefore, maximum detection of backscattered electrons may be desirable to obtain high resolution images of underlying defects.

SE and BSE collection efficiency may be enhanced using more than one detector placed advantageously to collect as many electrons as possible. However, one of the several challenges may include efficient detection of BSEs with medium emission angles. This may be desirable because backscattered electrons with emission angles in the range of 15°-65° constitute approximately 75% of the total BSEs generated.

In conventional SEMs, one of the several ways to enhance the collection efficiency of BSEs may include adjusting a position of the electron detector to capture BSEs with a wide range of emission angles. Although, the collection efficiency of BSEs having small and large emission angles may be improved, however, the collection efficiency of BSEs with medium emission angle remains low. Alternatively, the size of the opening of an electron detector may be reduced to increase the possibility of detecting medium emission angle BSEs, however, this may increase the aberrations of objective lens, and therefore, negatively affect the imaging resolution. Therefore, it may be desirable to detect BSEs with medium emission angles using a technique that improves the collection efficiency, while maintaining high imaging resolution.

Some embodiments of the present disclosure are directed to charged-particle beam apparatuses and methods of forming an image of a sample. The apparatus may include an electron detector having an electron detection layer substantially parallel to the primary optical axis such that substantially all or a great majority of BSEs with medium emission angle may be detected. In some embodiments, an electrostatic element, such as a deflector of deflection scanning unit, a beam booster, or a beam separator, among other things, may be configured to detect the BSEs by disposing a charged-particle detector on an inner surface of the electrostatic element, and depositing a thin conducting layer to deflect the primary incident beam on the sample. The detection layer of the charged-particle detector may be disposed substantially parallel to the primary optical axis such that substantially all BSEs with medium emission angle may be detected.

Relative dimensions of components in drawings may be exaggerated for clarity. Within the following description of drawings, the same or like reference numbers refer to the same or like components or entities, and only the differences with respect to the individual embodiments are described. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Reference is now made to FIG. 1, which illustrates an exemplary electron beam inspection (EBI) system 100 consistent with embodiments of the present disclosure. As shown in FIG. 1, charged particle beam inspection system 100 includes a main chamber 10, a load-lock chamber 20, an electron beam tool 40, and an equipment front end module (EFEM) 30. Electron beam tool 40 is located within main chamber 10. While the description and drawings are directed to an electron beam, it is appreciated that the embodiments are not used to limit the present disclosure to specific charged particles.

EFEM 30 includes a first loading port 30a and a second loading port 30b. EFEM 30 may include additional loading port(s). First loading port 30a and second loading port 30b receive wafer front opening unified pods (FOUPs) that contain wafers (e.g., semiconductor wafers or wafers made of other material(s)) or samples to be inspected (wafers and samples are collectively referred to as "wafers" hereafter). One or more robot arms (not shown) in EFEM 30 transport the wafers to load-lock chamber 20.

Load-lock chamber 20 is connected to a load/lock vacuum pump system (not shown), which removes gas molecules in load-lock chamber 20 to reach a first pressure below the atmospheric pressure. After reaching the first pressure, one or more robot arms (not shown) transport the wafer from load-lock chamber 20 to main chamber 10. Main chamber 10 is connected to a main chamber vacuum pump system (not shown), which removes gas molecules in main chamber 10 to reach a second pressure below the first pressure. After reaching the second pressure, the wafer is subject to inspection by electron beam tool 40. In some embodiments, electron beam tool 40 may comprise a single-beam inspection tool.

Controller 50 may be electronically connected to electron beam tool 40 and may be electronically connected to other components as well. Controller 50 may be a computer configured to execute various controls of charged particle beam inspection system 100. Controller 50 may also include processing circuitry configured to execute various signal and image processing functions. While controller 50 is shown in FIG. 1 as being outside of the structure that includes main chamber 10, load-lock chamber 20, and EFEM 30, it is appreciated that controller 50 can be part of the structure.

While the present disclosure provides examples of main chamber 10 housing an electron beam inspection system, it should be noted that aspects of the disclosure in their broadest sense, are not limited to a chamber housing an electron beam inspection system. Rather, it is appreciated that the foregoing principles may be applied to other chambers as well.

Figure 2:
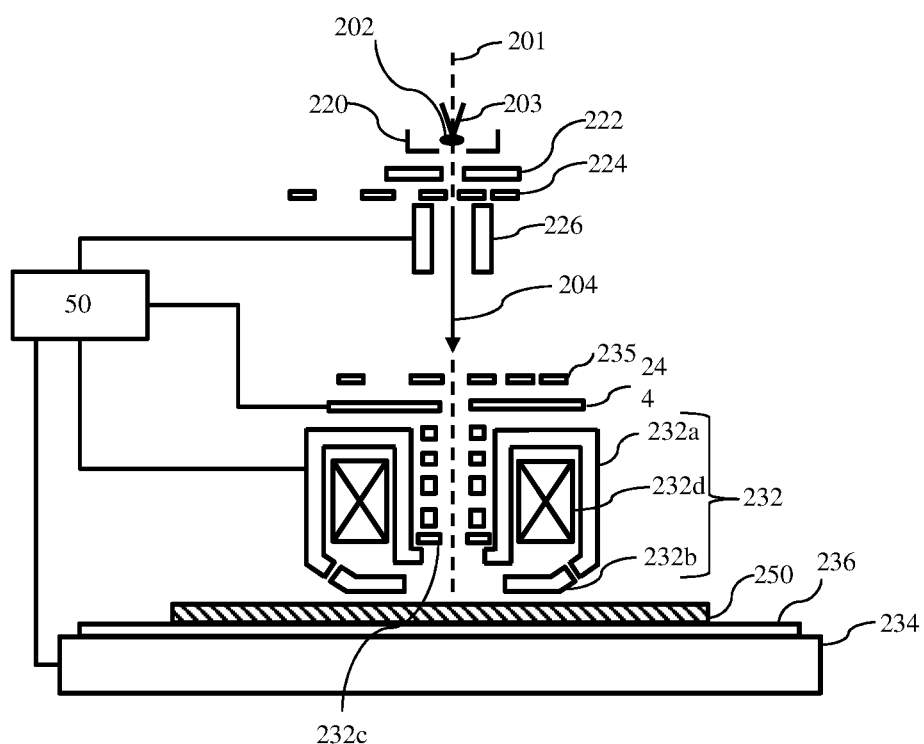
FIG. 2 is a schematic diagram illustrating an exemplary electron beam tool that can be a part of the exemplary electron beam inspection system of FIG. 1, consistent with embodiments of the present disclosure.

Reference is now made to FIG. 2, which illustrates a schematic diagram illustrating an exemplary configuration of electron beam tool 40 that can be a part of the exemplary charged particle beam inspection system 100 of FIG. 1, consistent with embodiments of the present disclosure. Electron beam tool 40 (also referred to herein as apparatus 40) may comprise an electron emitter, which may comprise a cathode 203, an anode 220, and a gun aperture 222. Electron beam tool 40 may further include a Coulomb aperture array 224, a condenser lens 226, a beam-limiting aperture array 235, an objective lens assembly 232, and an electron detector 244. Electron beam tool 40 may further include a sample holder 236 supported by motorized stage 234 to hold a sample 250 to be inspected. It is to be appreciated that other relevant components may be added or omitted, as needed.

In some embodiments, electron emitter may include cathode 203, an extractor anode 220, wherein primary electrons can be emitted from the cathode and extracted or accelerated to form a primary electron beam 204 that forms a primary beam crossover 202 (virtual or real). Primary electron beam 204 can be visualized as being emitted from primary beam crossover 202.

In some embodiments, the electron emitter, condenser lens 226, objective lens assembly 232, beam-limiting aperture array 235, and electron detector 244 may be aligned with a primary optical axis 201 of apparatus 40. In some embodiments, electron detector 244 may be placed off primary optical axis 201, along a secondary optical axis (not shown).

Objective lens assembly 232, in some embodiments, may comprise a modified swing objective retarding immersion lens (SORIL), which includes a pole piece 232a, a control electrode 232b, a deflector 232c (or more than one deflectors), and an exciting coil 232d. In a general imaging process, primary electron beam 204 emanating from the tip of cathode 203 is accelerated by an accelerating voltage applied to anode 220. A portion of primary electron beam 204 passes through gun aperture 222, and an aperture of Coulomb aperture array 224, and is focused by condenser lens 226 so as to fully or partially pass through an aperture of beam-limiting aperture array 235. The electrons passing through the aperture of beam-limiting aperture array 235 may be focused to form a probe spot on the surface of sample 250 by the modified SORIL lens and deflected to scan the surface of sample 250 by deflector 232c. Secondary electrons emanated from the sample surface may be collected by electron detector 244 to form an image of the scanned area of interest.

In objective lens assembly 232, exciting coil 232d and pole piece 232a may generate a magnetic field that begins at one end of pole piece 232a and terminates at the other end of pole piece 232a. A part of sample 250 being scanned by primary electron beam 204 can be immersed in the magnetic field and can be electrically charged, which, in turn, creates an electric field. The electric field may reduce the energy of impinging primary electron beam 204 near and on the surface of sample 250. Control electrode 232b, being electrically isolated from pole piece 232a, controls an electric field above and on sample 250 to reduce aberrations of objective lens assembly 232 and control focusing situation of signal electron beams for high detection efficiency. Deflector 232c may deflect primary electron beam 204 to facilitate beam scanning on the wafer. For example, in a scanning process, deflector 232c can be controlled to deflect primary electron beam 204, onto different locations of top surface of sample 250 at different time points, to provide data for image reconstruction for different parts of sample 250.

Backscattered electrons (BSEs) and secondary electrons (SEs) can be emitted from the part of sample 250 upon receiving primary electron beam 204. A beam separator (not shown) can direct the secondary or scattered electron beam (s), comprising backscattered and secondary electrons, to a sensor surface of electron detector 244. The detected secondary electron beams can form corresponding secondary electron beam spots on the sensor surface of electron detector 244. Electron detector 244 can generate signals (e.g., voltages, currents) that represent the intensities of the received secondary electron beam spots, and provide the signals to a processing system, such as controller 50. The intensity of secondary or backscattered electron beams, and the resultant beam spots, can vary according to the external or internal structure of sample 250. Moreover, as discussed above, primary electron beam 204 can be deflected onto different locations of the top surface of sample 250 to generate secondary or scattered electron beams (and the resultant beam spots) of different intensities. Therefore, by mapping the intensities of the secondary electron beam spots with the locations of primary electron beam 204 on sample 250, the processing system can reconstruct an image of sample 250 that reflects the internal or external structures of sample 250.

In some embodiments, controller 50 may comprise an image processing system that includes an image acquirer (not shown) and a storage (not shown). The image acquirer may comprise one or more processors. For example, the image acquirer may comprise a computer, server, mainframe host, terminals, personal computer, any kind of mobile computing devices, and the like, or a combination thereof. The image acquirer may be communicatively coupled to electron detector 244 of apparatus 40 through a medium such as an electrical conductor, optical fiber cable, portable storage media, IR, Bluetooth, internet, wireless network, wireless radio, among others, or a combination thereof. In some embodiments, the image acquirer may receive a signal from electron detector 244 and may construct an image. The image acquirer may thus acquire images of regions of sample 250. The image acquirer may also perform various post-processing functions, such as generating contours, superimposing indicators on an acquired image, and the like. The image acquirer may be configured to perform adjustments of brightness and contrast, etc. of acquired images. In some embodiments, the storage may be a storage medium such as a hard disk, flash drive, cloud storage, random access memory (RAM), other types of computer readable memory, and the like. The storage may be coupled with the image acquirer and may be used for saving scanned raw image data as original images, and post-processed images.

In some embodiments, controller 50 may include measurement circuitries (e.g., analog-to-digital converters) to obtain a distribution of the detected secondary electrons. The electron distribution data collected during a detection time window, in combination with corresponding scan path data of a primary beam 204 incident on the sample (e.g., a wafer) surface, can be used to reconstruct images of the wafer structures under inspection. The reconstructed images can be used to reveal various features of the internal or external structures of sample 250, and thereby can be used to reveal any defects that may exist in sample 250 (such as wafer).

In some embodiments, controller 50 may control motorized stage 234 to move sample 250 during inspection. In some embodiments, controller 50 may enable motorized stage 234 to move sample 250 in a direction continuously at a constant speed. In other embodiments, controller 50 may enable motorized stage 234 to change the speed of the movement of sample 250 over time depending on the steps of scanning process.

Figure 3A:
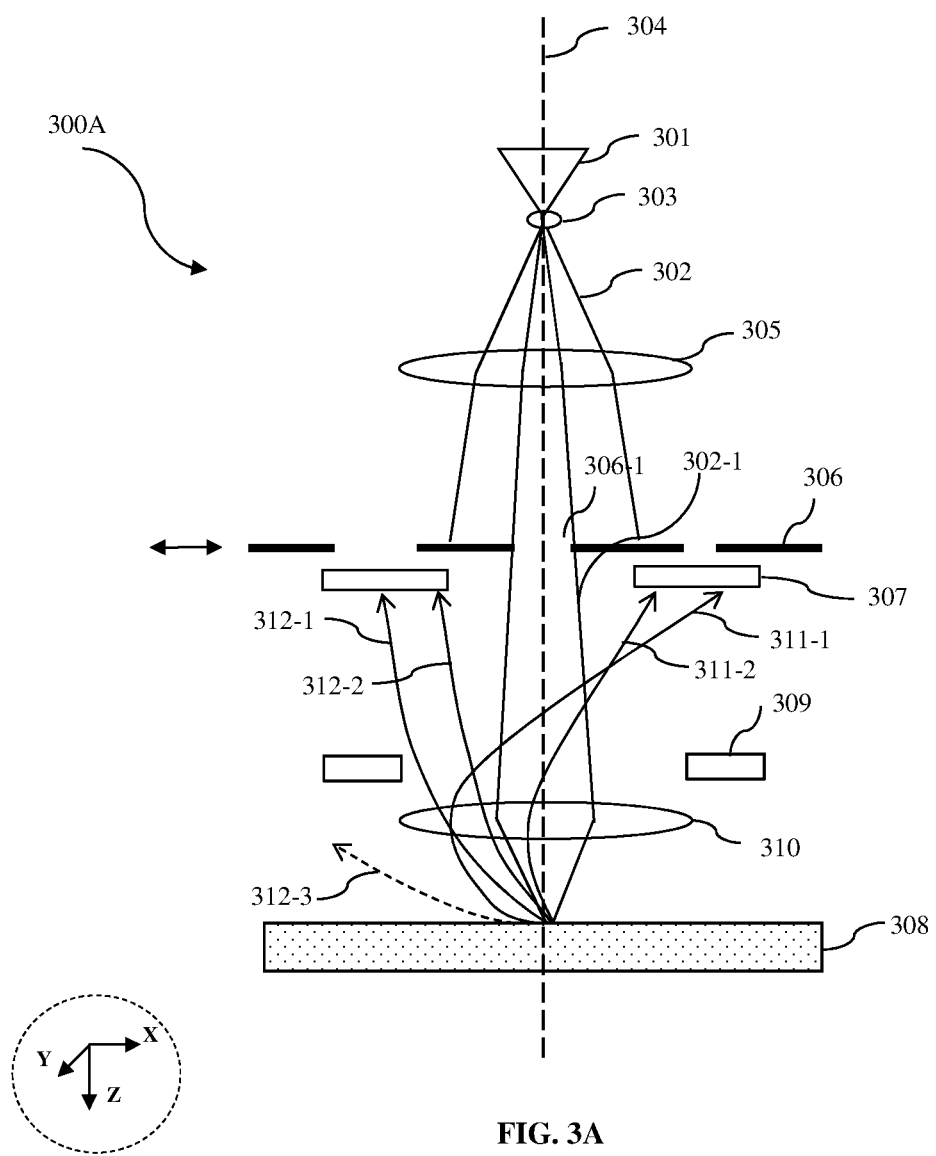
FIGS. 3A is a schematic diagram of an exemplary configuration 300A of a charged-particle beam apparatus 40 comprising a charged-particle detector.

Reference is now made to FIG. 3A, which illustrates a schematic diagram of an exemplary configuration 300A of a charged-particle beam apparatus 40 comprising a charged-particle detector. In some conventional SEMs, configuration 300A of apparatus 40 may comprise an electron source 301 configured to emit primary electrons from a cathode and extracted to form a primary electron beam 302 that emanates from a primary beam crossover (virtual or real) 303 along a primary optical axis 304. Apparatus 40 may further comprise a condenser lens 305, a beam-limiting aperture array 306, an in-lens electron detector 307, a scanning deflection unit 309, and an objective lens assembly 310. In the context of this disclosure, an in-lens electron detector refers to a charged-particle detector (e.g., electron detector) located inside the electro-optic column of a SEM and may be arranged rotationally symmetric around the primary optical axis (e.g., primary optical axis 304). In some embodiments, it may also be referred to as through-the lens, immersion lens detector, upper detector, or second electron detector. It is to be appreciated that relevant components may be added or omitted or reordered, as appropriate.

In currently existing SEMs, as shown in FIG. 3A, primary electron beam 302 may be emitted from electron source 301 and accelerated to a higher energy by an anode. A gun aperture may limit the current of primary electron beam 302 to a desired value. Primary electron beam 302 may be focused by condenser lens 305 and objective lens assembly 310 to form a small probe spot on the surface of a sample 308. The focusing power of condenser lens 305 and the opening size of an aperture of beam-limiting aperture array 306 may be selected to get a desired probe current and make the probe spot size as small as possible. To obtain small spot sizes over a large range of probe current, beam-limiting aperture array 306 may comprise multiple apertures having various sizes. For example, aperture 306-1 of beam-limiting aperture array 306 may be configured to generate primary electron beamlet 302-1 by blocking peripheral electrons of primary electron beam 302, based on a desired probe current or a probe spot size. One or more deflectors of scanning deflection unit 309 may be configured to deflect primary electron beam 302 to scan a desired area on the surface of sample 308. As shown in FIG. 3A, interaction of primary electron beamlet 302-1 with sample 308 may generate SEs and BSEs. Secondary electrons may be identified as signal electrons with low emission energies, and backscattered electrons may be identified as signal electrons with high emission energies. Because of their low emission energy, objective lens assembly 310 may strongly focus the SEs (such as along electron path 311-1 or 311-2) to mostly land on a detection layer of in-lens detector 307. Because of their high emission energy, objective lens assembly 310 may weakly focus the BSEs. Accordingly, BSEs with small emission angles may travel along electron path 312-1 and 312-2 and be detected by in-lens electron detector 307 as well. In some cases, BSEs with large emission angles, for example 312-3, may be detected using additional electron detectors, a backscattered electron detector, or remain undetected resulting in loss of resolution or lack of information needed to inspect a sample.

Detection and inspection of some defects in semiconductor fabrication processes, such as buried particles during photolithography, metal deposition, dry etching, or wet etching, among other things, may benefit from inspection of sample surface features as well as compositional analysis of the features below sample surface. In such scenarios, a user may utilize information obtained from secondary electron detectors and backscattered electron detectors to identify the defect(s), analyze the composition of the defect(s), and adjust process parameters based on the obtained information, among other things.

As is commonly known in the art, the emission of SEs and BSEs obeys Lambert's law and has a large energy spread. SEs and BSEs are generated upon interaction of primary electron beam 302 with sample 308, from different depths of the sample and have different emission energies. For example, secondary electrons originate from the surface and may have an emission energy ≤50 eV. SEs may be useful in providing information about surface features or surface geometries. BSEs, on the other hand, may be generated by elastic scattering events of the incident electrons of primary electron beam 302 and may have higher emission energies in comparison to SEs, in a range from 50 eV to approximately the landing energy of the incident electrons, and provide compositional information of the material being inspected. The number of backscattered electrons generated may depend on factors including, but are not limited to, atomic number of the material in the sample, landing energy of primary electron beam, among other things.

Based on the difference in emission energy, or emission angle, among other things, SEs and BSEs may be separately detected using separate electron detectors, segmented electron detectors, energy filters, and the like. For example, as shown in FIG. 3A, in-lens electron detector 307 may be configured as a segmented detector (discussed later in reference to FIG. 7A) comprising multiple segments arranged in a two-dimensional or a three-dimensional arrangement. In some cases, the segments of in-lens electron detector 307 may be arranged radially, circumferentially, or azimuthally around primary optical axis 304.

Configuration 300A may comprise condenser lens 305 configured to focus primary electron beam 302 so that a portion 302-1 thereof may pass through an on-axis opening 306-1 of beam-limiting aperture array 306. Condenser lens 305 may be substantially similar to condenser lens 226 of FIG. 2 and may perform similar functions. Condenser lens 305 may comprise an electrostatic, a magnetic, or a compound electromagnetic lens, among others. Condenser lens 305 may be electrically or communicatively coupled with a controller, such as controller 50 illustrated in FIG. 2. Controller 50 may apply an electrical excitation signal to condenser lens 305 to adjust the focusing power of condenser lens 305 based on factors including, but are not limited to, operation mode, application, desired analysis, sample material being inspected, among other things.

Configuration 300A may further comprise scanning deflection unit 309 configured to dynamically deflect primary electron beam 302 or primary electron beamlet 302-1 on surface of sample 308. The dynamic deflection of primary electron beamlet 302-1 may cause a desired area or a desired region of interest to be scanned, for example in a raster scan pattern, to generate SEs and BSEs for sample inspection. Scanning deflection unit 309 may comprise one or more deflectors (e.g., deflector 309-1 or 309-2 of FIG. 3B, discussed later) configured to deflect primary electron beam 302 in X-axis or Y-axis. As used herein, X-axis and Y-axis form Cartesian coordinates, and primary electron beam 302 propagates along Z-axis or primary optical axis 304. X-axis refers to the horizontal axis or the lateral axis extending along the width of the paper, and Y-axis refers to the vertical axis extending in-and-out of the plane of the paper.

Electrons are negatively charged particles and travel through the electron column at high energy and high speeds. One way to deflect the electrons is to pass them through an electric field generated for example, by a pair of plates held at two different potentials, passing current through deflection coils, among other things. Varying the electric field across a deflector may vary the deflection angle of electrons in primary electron beam 302 based on factors including, but are not limited to, electron energy, electric field applied, dimensions of deflectors, among other things. In some cases, scanning deflection unit 309 may comprise more than one deflector. One or more deflectors of scanning deflection unit 309 may be located within objective lens assembly 310.

Configuration 300A may further comprise objective lens assembly 310 configured to focus primary electron beam 302 or primary electron beamlet 302-1 on a surface of sample 308. Objective lens assembly 310 may be further configured to focus signal electrons (e.g., secondary electrons) having low emission energies on a detection layer of a signal electron detector (e.g., in-lens electron detector 307 of FIG. 3A). Objective lens assembly 310 may be substantially similar or perform substantially similar functions to objective lens assembly 232 of FIG. 2.

Figure 3B:
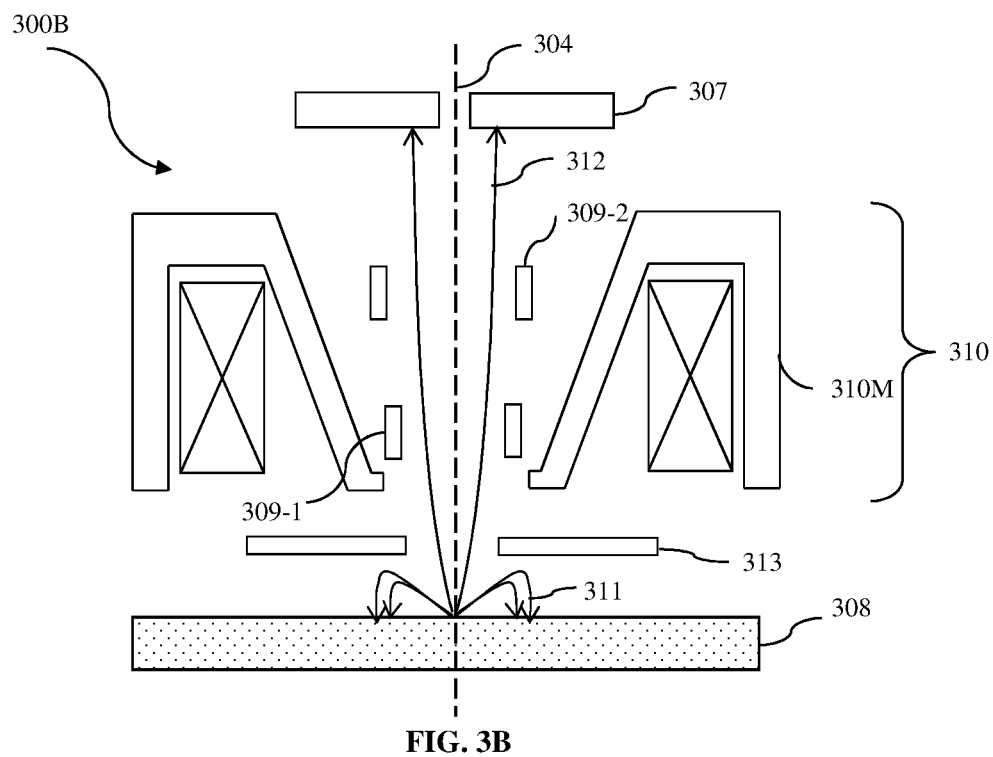
FIGS. 3B and 3C are schematic diagrams illustrating exemplary configurations 300B and 300C, respectively of a charged-particle beam apparatus comprising a charged-particle detector and an energy filter.

Reference is now made to FIG. 3B, which illustrates a schematic diagram of an exemplary configuration 300B of a charged-particle beam apparatus 40 comprising a charged-particle detector and an energy filter. As shown in FIG. 3B, configuration 300B may comprise a magnetic objective lens assembly 310 and deflectors 309-1 and 309-2. In some embodiments, objective lens assembly 310 may comprise a compound electromagnetic lens including a magnetic lens 310M and an electrostatic lens formed by control electrode 313, inner pole piece (e.g., pole piece 232a of FIG. 2) of objective lens assembly 310, and sample 308.

One of several ways to separately detect signal electrons such as SEs and BSEs based on their emission energy includes passing the signal electrons generated from probe spots on sample 308 through an energy filter. In some embodiments, control electrode 313 may comprise an energy filter between sample 308 and in-lens electron detector 307. In some embodiments, control electrode 313 may be disposed between sample 308 and magnetic lens 310M of objective lens assembly 310. Control electrode 313 may be biased with reference to the sample to form a potential barrier for the signal electrons having a threshold emission energy. For example, control electrode 313 may be biased negatively with reference to sample 308 such that the negatively charged signal electrons (e.g., secondary electrons in path 311) are deflected back to sample 308. As a result, only signal electrons that have emission energies high enough (e.g., backscattered electrons in path 312) to overcome the energy barrier formed by control electrode 313 propagate towards in-lens electron detector 307. In some embodiments, in-lens electron detector 307 may be configured as a secondary electron detector, or a backscattered electron detector. It is appreciated that 311 and 312 indicate paths of secondary and backscattered electrons, respectively.

Figure 3C:
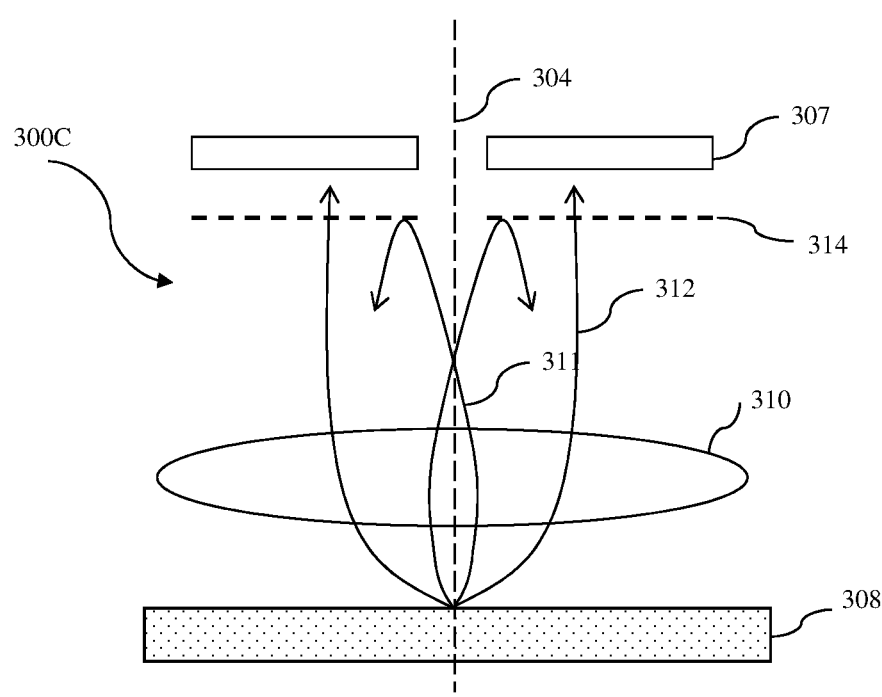

Reference is now made to FIG. 3C, which illustrates a schematic diagram of an exemplary configuration 300C of a charged-particle beam apparatus 40 comprising a charged-particle detector and an energy filter. In comparison to configuration 300B of FIG. 3B, configuration 300C comprises an energy filter disposed near in-lens electron detector 307. The energy filter as shown in FIG. 3C may comprise, for example, a mesh-type electrode 314 configured to deflect signal electrons with low emission energies (e.g., secondary electrons in path 311) back towards sample 308 or objective lens assembly 310, and allow signal electrons with high emission energies (e.g., backscattered electrons in path 312) to be incident on a detection layer of in-lens electron detector 307. In some embodiments, mesh-type electrode 314 may comprise a mesh-like structure fabricated from an electrically conducting material including, but is not limited to, a metal, an alloy, a semiconductor, a composite, among other things. Mesh-type electrode 314 may be disposed between objective lens assembly 310 and in-lens electron detector 307. In some embodiments, mesh-type electrode 314 may be disposed closer to in-lens electron detector 307 than objective lens assembly 310.

Figure 3D:
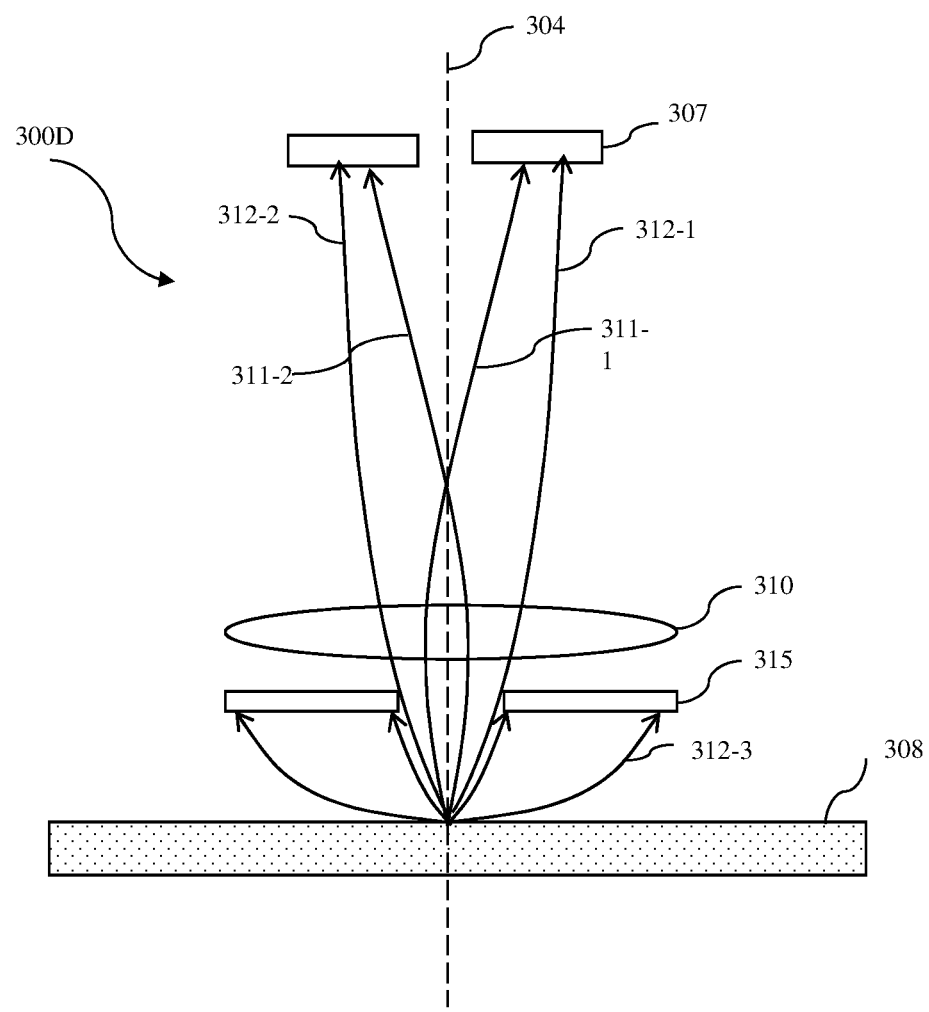
FIG. 3D is a schematic diagram illustrating an exemplary configuration 300D of a charged-particle beam apparatus 40 comprising a plurality of charged-particle detectors.
Figure 3D:
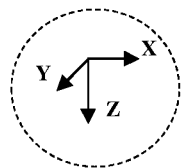

Reference is now made to FIG. 3D, which illustrates a schematic diagram of an exemplary configuration 300D of a charged-particle beam apparatus 40 comprising a plurality of charged-particle detectors. In comparison with FIGS. 3A-3C, configuration 300D of FIG. 3D comprises a backscattered electron detector 315 configured to detect signal electrons having high emission energies and high emission polar angles. In the context of this disclosure, emission polar angles are measured with reference to a primary optical axis (e.g., primary optical axis 304 of FIGS. 3A-3D) substantially perpendicular to sample 308. For example, emission polar angles of secondary electrons in path 311-1 and 311-2 are small and emission polar angles of backscattered electrons in path 312-1, 312-2, and 312-3 are larger in comparison with emission polar angles of secondary electrons. A backscattered electron detector 315 may be placed between objective lens assembly 310 and sample 308, and in-lens electron detector 307 may be placed between objective lens assembly 310 and condenser lens (not shown, e.g., condenser lens 305 of FIG. 3A), allowing the detection of secondary as well as backscattered electrons.

In a single charged-particle beam apparatus (such as a single beam SEM), the collection efficiency for BSEs may be improved by using energy filters, additional electron detectors, adjusting positions and sizes of existing electron detectors, among other things (as discussed in reference to FIGS. 3A-3D). However, the improvement in BSE collection efficiency may not be adequate to obtain high resolution images to allow a user to inspect micro or nano-defects.

As an example, as illustrated in FIG. 3A, placing an electron detector above an objective lens assembly (e.g., objective lens assembly 310 of FIG. 3A) may only collect a portion of BSEs having small emission polar angles, identified as BSEs in path 312-1 and 312-2. The BSEs having larger emission polar angles, such as BSEs in path 312-3 may be lost and remain undetected, resulting in poor BSE collection efficiencies.

As an alternative to placing the electron detector above the objective lens, an electron detector may also be placed below the objective lens to capture BSEs with large emission polar angles, as illustrated in FIG. 3D. Though useful in improving BSE collection efficiency, such an arrangement may still not be suitable to maximize the BSE collection efficiency. The SEs and BSEs have Lambertian emission distributions such that the yield is proportional to $\cos(\Theta)$, where $\Theta$ is the emission polar angle relative to the sample surface normal. Because of the cosine angular distribution of emission, the number of signal electrons with small and large emission polar angles is lower in comparison to the number of signal electrons with medium emission polar angles. Although signal electrons with medium emission angles may be collected by reducing the size of the opening of the electron detector below the objective lens assembly, however, it may negatively impact the aberrations of the objective lens, thereby affecting the resolution of the images.

In other configurations, such as illustrated in FIGS. 3B and 3C, a control electrode may be implemented as an energy filter to separate SEs from BSEs, and thus improve individual collection efficiencies. However, placing the negatively biased energy filter closer to the sample (as illustrated in FIG. 3B) may increase the aberrations of the objective lens assembly, thereby adversely impacting the imaging resolution. As an alternative, the energy filter may be placed closer to the in-lens electron detector (e.g., mesh-type electrode 314 illustrated in FIG. 3C) to minimize the impact of bias applied to the energy filter on the aberrations of the objective lens assembly. However, in such a configuration, to avoid the influence of the energy filter on the primary electron beam, usually a shielding mesh (not shown) is used in the entrance (where signal electrons enter) of the energy filter. Some of the signal electrons may be blocked or scattered by the shielding mesh and may not enter the energy filter. Accordingly, the collection efficiency is reduced. Hence in some configurations, the in-lens detector and the energy filter are placed off primary optical axis and a beam separator may be used to deflect the incoming signal electrons towards the energy filter. The beam separator may add undesirable aberrations to the incident primary electron beam, thereby negatively affecting the imaging resolution.

Figure 4:
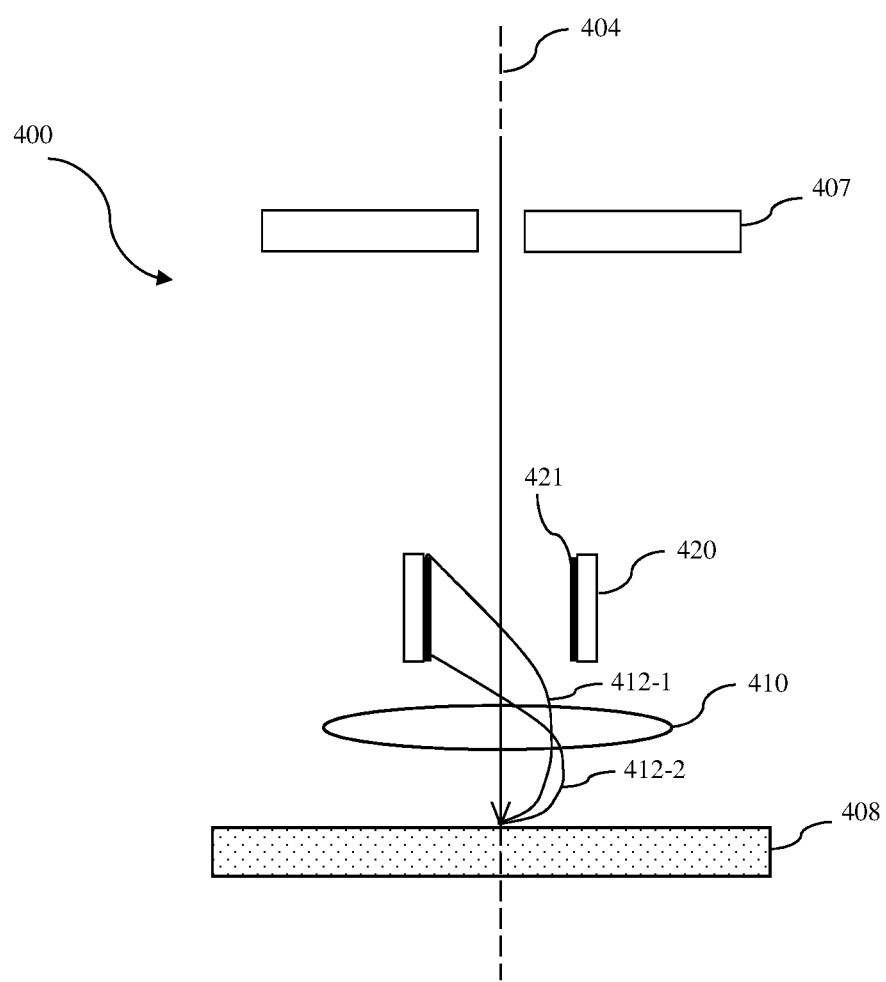
FIG. 4 is a schematic diagram illustrating an exemplary configuration of a charged-particle beam apparatus comprising a charged-particle detector, consistent with embodiments of the present disclosure.
Figure 4:
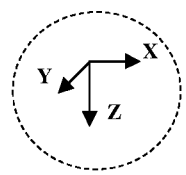

Reference is now made to FIG. 4, which illustrates an exemplary configuration 400 of charged-particle beam apparatus 40 of FIG. 1 comprising a charged-particle detector, consistent with embodiments of the present disclosure. Charged-particle beam apparatus 40 (also referred to herein as apparatus 40) in configuration 400 may comprise an in-lens electron detector 407 (analogous to in-lens electron detector 307 of FIGS. 3A-3D), a primary electron beam (not shown) propagating along primary optical axis 404 and focused on sample 408 using an objective lens assembly 410 (analogous to objective lens assembly 310 of FIGS. 3A-3D). In addition to in-lens electron detector 407, charged-particle beam apparatus 40 may further comprise a signal electron detector 420 having an electron detection layer 421, configured to detect signal electrons with high emission energy and medium emission polar angles, such as BSEs ((BSEs in path 412-1 and 412-2) generated from a probe spot on sample 408 upon interaction with incident electrons of primary electron beam 402 (not illustrated).

In some embodiments, signal electron detector 420 may be placed such that electron detection layer 421 of signal electron detector 420 may be substantially vertical relative to the plane of sample 408. In some embodiments, signal electron detector 420 may be placed such that electron detection layer 421 of signal electron detector 420 may be substantially parallel to primary optical axis 404. In some embodiments, electron detection layer 421 may comprise or may be disposed on an inner surface of signal electron detector 420. As used herein, an inner surface refers to a surface proximal to the primary optical axis or a surface exposed directly to the incident primary, secondary, or backscattered electrons.

In some embodiments, signal electron detector 420 may comprise a vertical secondary electron detector, a vertical backscattered electron detector, or a vertical electrostatic element of apparatus 40 configured to detect a portion of signal electrons generated from sample 408. In some embodiments, although not illustrated, more than one vertical signal electron detectors 420 may be employed based on factors including, but are not limited to, design and space availability, desired imaging resolution, desired BSE collection efficiency, among other things. In such configurations, signal electrons having a range of emission polar angles may be detected separately.

In some embodiments, signal electron detector(s) 420 may be configured to detect a portion of signal electrons based on characteristics of the signal electrons. The characteristics may include, but are not limited to, emission energy, emission polar angle, emission azimuth angle, among other things. For example, the vertical signal electron detector(s) 420 may be configured to detect signal electrons having high emission energy (>50 eV) and a medium emission polar angle in the range of 15° to 65° relative to primary optical axis 404. In some embodiments, based on the number of signal electron detector(s) 420 used, they may be placed such that they are configured to detect signal electrons having a predefined range of emission polar angles. As an example, a signal electron detector 420-1 (not illustrated) may be configured to detect a portion of signal electrons having high emission energy and emission polar angle in the range of 15° to 40°, and another signal electron detector 420-2 (not illustrated) may be configured to detect a portion of signal electrons having high emission energy and emission polar angle in the range of 40° to 65°. It is appreciated that the number, position, and type of signal electron detectors 420 may be adjusted, as appropriate and needed.

In some embodiments, signal electron detector 420 may be disposed between objective lens assembly 410 and in-lens electron detector 407. In some embodiments, signal electron detector 420 may be disposed between sample 408 and in-lens electron detector 407. In some embodiments, more than one signal electron detectors 420 may be disposed between sample 408 and in-lens electron detector 407.

In some embodiments, signal electron detector 420 may comprise a monolithic electron detector, or a segmented electron detector. In a monolithic electron detector, electron detection layer 421 may comprise a non-segmented layer of charged-particle sensitive material. In a segmented electron detector, electron detection layer 421 may comprise a discontinuous layer of charged-particle sensitive material, forming segments of the segmented electron detector. The segments of the segmented electron detector may be arranged in a two-dimensional (2D) or a three-dimensional (3D) arrangement around primary optical axis 404. The segments of the segmented electron detector may be arranged linearly, radially, circumferentially, or azimuthally around primary optical axis 404. The charged-particle sensitive material may be sensitive to charged particles such as ionizing radiation, electrons, X-rays, photons, among other things.

Figure 5:
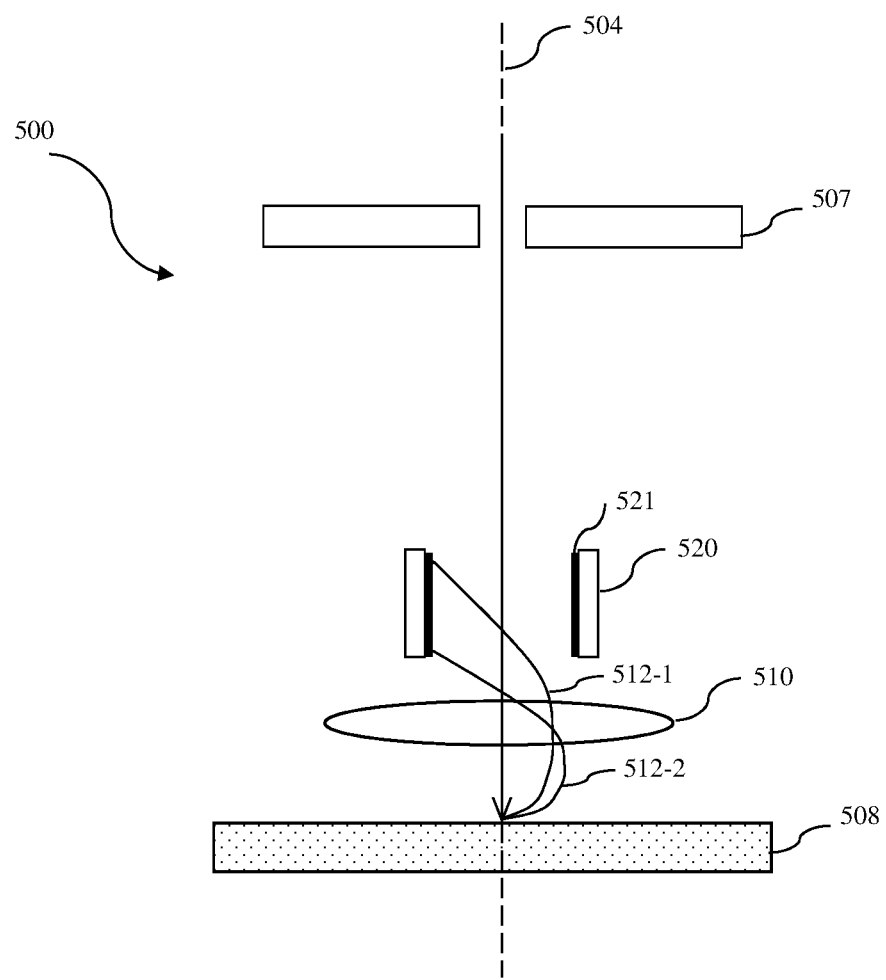
FIG. 5 is a schematic diagram illustrating an exemplary configuration of a charged-particle beam apparatus comprising an electrostatic element, consistent with embodiments of the present disclosure.
Figure 5:
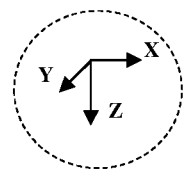

Reference is now made to FIG. 5, which illustrates an exemplary configuration 500 of charged-particle beam apparatus 40 of FIG. 1 comprising an electrostatic element, consistent with embodiments of the present disclosure. In comparison with configuration 400, charged-particle beam apparatus 40 (also referred to herein as apparatus 40) in configuration 500 may comprise an electrostatic or magnetic element 520 having an electron detection layer 521, configured to detect signal electrons with high emission energy and medium emission polar angles, such as BSEs (BSEs in path 512-1 and 512-2) generated from a probe spot on sample 508 upon interaction with incident electrons of primary electron beam 502 (not illustrated). It is appreciated that apparatus 40 may comprise one or more electrostatic or magnetic elements 520, as appropriate.

In some embodiments, electrostatic or magnetic element 520 may comprise a scanning deflection unit (e.g., scanning deflection unit 309 of FIG. 3A and 3B), a beam booster, or a beam separator, among other things. Electrostatic or magnetic element 520 may be disposed between sample 508 and in-lens electron detector 507 along primary optical axis 504. In some embodiments, electrostatic element 520, objective lens assembly 510, and in-lens electron detector 507 may be aligned with and be rotationally symmetric with primary optical axis 504.

In some embodiments, electrostatic or magnetic element 520 may be placed such that electron detection layer 521 of electrostatic or magnetic element 520 may be substantially vertical relative to the plane of sample 508. In some embodiments, electrostatic or magnetic element 520 may be placed such that electron detection layer 521 of electrostatic or magnetic element 520 may be substantially parallel to primary optical axis 504. In some embodiments, electron detection layer 521 may comprise, or may be disposed on an inner surface of electrostatic or magnetic element 520, or may be disposed on a portion of the inner surface of electrostatic or magnetic element 520.

In some embodiments, electrostatic or magnetic element(s) 520 may be configured to detect a portion of signal electrons based on characteristics of the signal electrons. The characteristics may include, but are not limited to, emission energy, emission polar angle, emission azimuth angle, among other things. For example, a vertical electrostatic or magnetic element 520 may be configured to detect signal electrons having high emission energy (>50 eV) and a medium emission polar angle in the range of 15° to 65° relative to primary optical axis 504.

In some embodiments, electrostatic or magnetic element(s) 520 may comprise one or more deflectors (e.g., deflector 309-1 and 309-2 of FIG. 3B) of scanning deflection unit 309 configured to detect BSEs having high emission energy and medium emission polar angles. In such configurations, the deflectors may perform detection of BSEs and deflection of primary electron beam (e.g., primary electron beam 302 of FIG. 3A). Electron detection layer 521 of electrostatic or magnetic element 520 may comprise an inner surface of one or more deflectors configured as a charged-particle sensitive surface. Details of configuring electrostatic or magnetic element 520 or inner surfaces of electrostatic or magnetic element(s) 520 are discussed later with reference to FIGS. 8 and 9.

In some embodiments, inner surface of a deflector or deflection scanning unit may be segmented in a circumferential direction such that the inner surface of a pole of a multipole structure of the deflector is configured to detect BSEs. In some embodiments, each pole of a multipole structure of a deflector is configured to detect BSEs.

In some embodiments, electrostatic or magnetic element 520 may comprise a beam separator such as a Wien filter. The inner surface of a beam separator may be configured to detect BSEs. It is appreciated that any electrostatic or magnetic element disposed between sample 508 and in-lens electron detector 507 may be configured to detect BSEs, as appropriate.

Figure 6A:
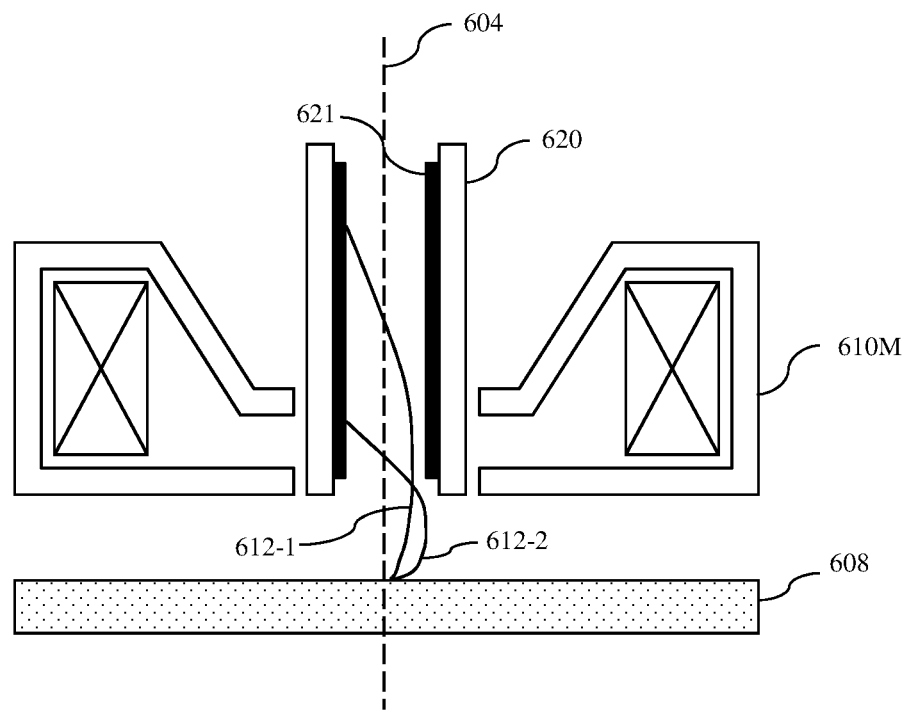
FIGS. 6A and 6B are schematic diagrams illustrating exemplary configurations of a portion of a beam booster tube of a charged-particle beam apparatus, consistent with embodiments of the present disclosure.
Figure 6B:
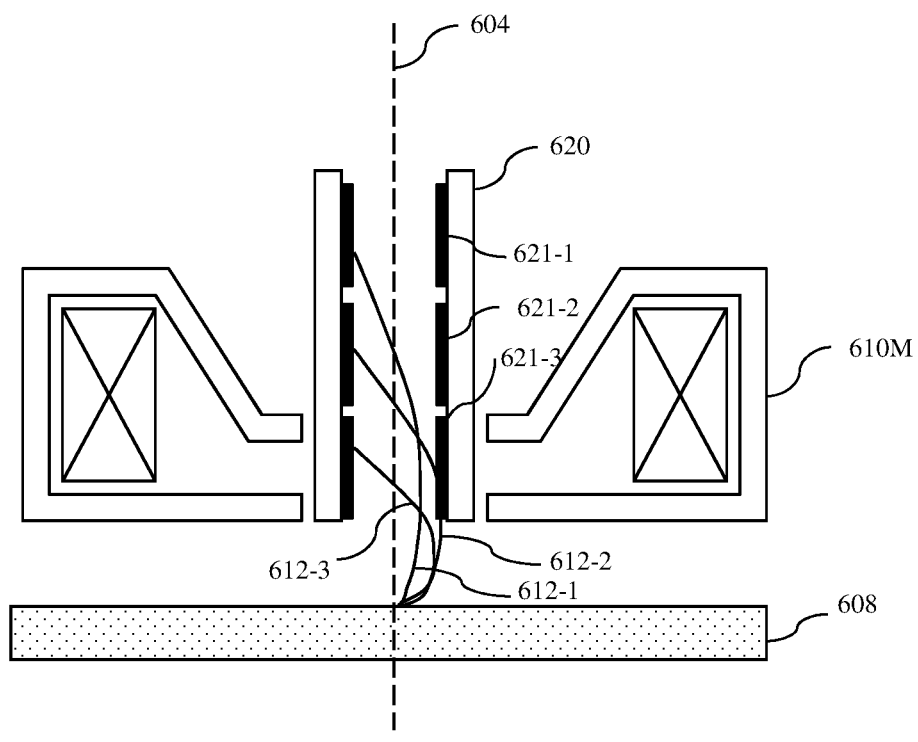

Reference is now made to FIGS. 6A and 6B, which illustrate schematic diagrams of exemplary configurations of a portion of a beam booster, consistent with embodiments of the present disclosure. As shown in FIG. 6A, apparatus 40 of FIG. 1 may comprise a beam booster 620 configured to maintain the energy of the primary electrons propagating down the electro-optic column of SEM and slowed down to a desired energy shortly before striking sample 608. In conventional SEMs, as the primary electrons may be accelerated to a few keV to go through the electro-optic column, Coulomb effect (electron interactions) may induce the electrons to focus above or below the sample surface, causing an increase in spot size and a loss of imaging resolution. By biasing beam booster 620 to a higher potential than the electro-optic column (such as magnetic objective lens 610M in FIG. 6A), it may be possible to reduce the Coulomb effect, by for example, reducing the spot size on the surface of sample 608. In addition, it may be preferable to reduce the energy of incident primary electrons to minimize the physical damage to sample 608 while maintaining the spot size.

In some embodiments, inner surface 621 of beam booster 620 may be configured to detect signal electrons with high emission energy and medium emission polar angles, such as BSEs (e.g., BSEs in path 612-1 and 612-2) generated from a probe spot on sample 608 upon interaction with incident electrons of primary electron beam 602 (not illustrated).

FIG. 6A illustrates a non-segmented layer of charged-particle sensitive material disposed on inner surface 621 (also referred to as electron detection layer 621) of a portion of beam booster 620 inside magnetic objective lens 610M. In some embodiments, inner surface 621 of beam booster 620 may be extended in length to detect substantially all BSEs having high emission energies and medium emission angles to maximize the BSE collection efficiency, and thereby improve imaging resolution.

FIG. 6B illustrates a discontinuous layer of charged-particle sensitive material disposed on inner surface of a portion of beam booster 620 inside magnetic objective lens 610M. The discontinuous coverage of the inner surface may form a plurality of segments 621-1, 621-2, and 621-3 configured to detect BSEs in path 612-1, 612-2, and 612-3, respectively. The segmented inner surface 621 of beam booster 620 may be used to detect BSEs having a range of emission polar angles and emission energies. It is appreciated that although FIG. 6B illustrates a linear arrangement of segments 621-1, 621-2 and 621-3 along primary optical axis 604, other arrangements may be possible, as appropriate.

Figure 7A:
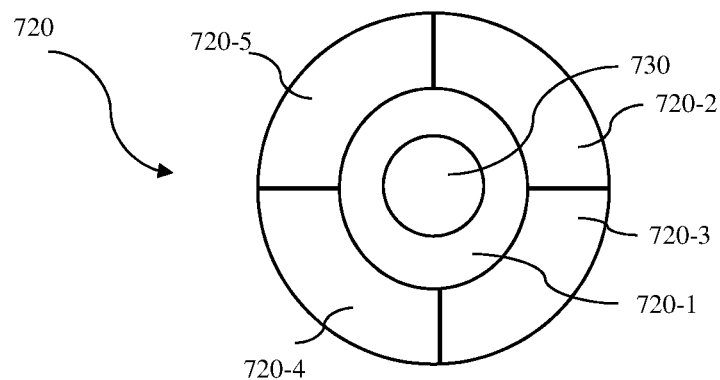
FIG. 7A is a schematic illustration of a segmented charged-particle detector, consistent with embodiments of the present disclosure.

Reference is now made to FIG. 7A, which illustrates a schematic diagram of a segmented electron detector 720, consistent with embodiments of the present disclosure. Segmented electron detector 720 may comprise an opening 730 configured to allow passage of a primary electron beam (e.g., primary electron beam 302 of FIG. 3A), and a plurality of segments 720-1-720-5. In some embodiments, segmented electron detector 720 may be a backscattered electron detector (e.g., backscattered electron detector 315 of FIG. 3D) placed between a sample (e.g., sample 308 of FIG. 3A) and an in-lens electron detector (e.g., in-lens electron detector 307 of FIG. 3A) or an objective lens assembly (objective lens assembly 310 of FIG. 3A), or may be the in-lens electron detector, or may be a vertical electron detector. In some embodiments, segmented electron detector 720 may be cylindrical with a circular, elliptical, or polygonal cross-section. Although FIG. 7A illustrates a circular cross-section of a cylindrical segmented electron detector, other cross-sections and shapes may be used as well, as appropriate. In some embodiments, one or more segments of segmented electron detector 720 may be arranged radially, circumferentially, or azimuthally along a primary optical axis (e.g., primary optical axis 304 of FIG. 3A) in a 2D arrangement.

In some embodiments, one or more segments 720-1-720-5 may be configured to detect electrons based on the emission energy, emission polar angle, or emission azimuth angle, among other things.

Figures 7B, 7C:
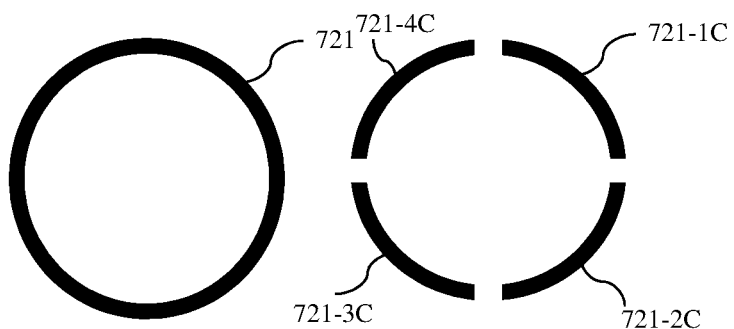
FIGS. 7B-7D are schematic diagrams illustrating exemplary configurations of a detection layer of a charged-particle detector, consistent with embodiments of the present disclosure.
Figure 7D:
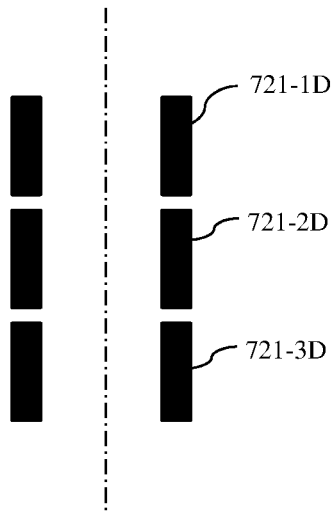

Reference is now made to FIGS. 7B-7D, which illustrate exemplary configurations of charged-particle detection layers of a charged-particle detector such as an electron detector, consistent with embodiments of the present disclosure.

FIG. 7B illustrates a non-segmented electron detection layer 721 as used in, for example, a monolithic electron detector. Electron detection layer 721 may comprise a layer of charged-particle sensitive material disposed on an inner surface of an electrostatic or magnetic element (e.g., electrostatic or magnetic element 520 of FIG. 5). The charged-particle sensitive material may be configured to detect charged-particles including, but are not limited to, ionizing radiation, electrons, X-rays, photons, among other things. Electron detection layer 721 may be arranged linearly, radially, circumferentially, or azimuthally around a primary optical axis (e.g., primary optical axis 304 of FIG. 3A). Electron detection layer 721 may be disposed such that it is substantially parallel to the primary optical axis or substantially vertical to sample surface.

FIGS. 7C and 7D illustrate segmented detection layers as used in, for example, a segmented electron detector. Although FIG. 7C illustrates four segments 721-1C, 721-2C, 721-3C, and 721-4C, it is appreciated that any number of segments may be used, as appropriate. Segments 721-1C-721-4C may be arranged linearly, radially, circumferentially, azimuthally, etc. around a primary optical axis. As shown in FIG. 7D, segments 721-1D, 721-2D, and 721-3D may be arranged linearly in a 3D arrangement along the primary optical axis. In some embodiments, segments 721-1D, 721-2D, and 721-3D may be configured to detect BSEs with a range of emission energy and emission polar angles. In some embodiments, one or more segments 721-1D, 721-2D, and 721-3D may be substantially parallel to the primary optical axis or substantially vertical to sample surface.

One of the several ways to increase BSE collection efficiency in a SEM, among other things, includes configuring an electrostatic or magnetic element (e.g., electrostatic element 520 of FIG. 5) to detect BSEs having high emission energy and medium emission polar angles, which may otherwise remain undetected. Electrostatic or magnetic element 520 may comprise one or more deflectors of scanning deflection unit 309, one or more portions of beam booster 620, a beam separator (not illustrated), among other things. It is appreciated that any electrostatic or magnetic element placed between the sample and in-lens electron detector (e.g., in-lens electron detector 307 of FIG. 3A) may be configured as a BSE detector.

Figure 8:
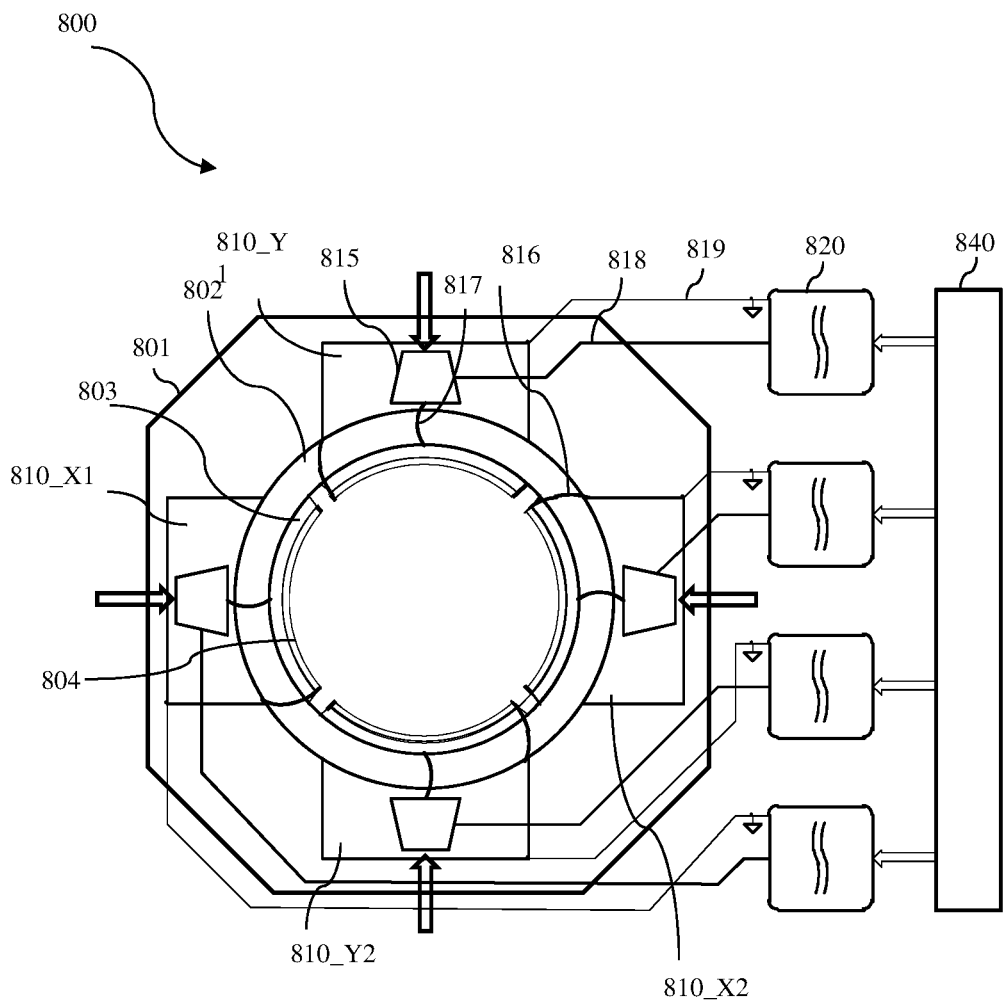
FIG. 8 is a schematic illustration of an exemplary configuration of a charged-particle detection apparatus, consistent with embodiments of the present disclosure.

Reference is now made to FIG. 8, which illustrates an exemplary plan-view configuration of a charged-particle detection apparatus 800, consistent with embodiments of the present disclosure. Charged-particle detection apparatus 800 may comprise a substrate 801, a support structure 802, a charged-particle detector 803, a conducting layer 804, deflection scanning electrodes 810_Y1, 810_Y2, 810_X1 and 810_X2, a readout circuit 815, a scan signal wire 816, an image signal wire 817, a power source 820 supplying power to readout circuit 815 through connection 818, and a power bus 840.

In some embodiments, charged-particle detection apparatus 800 may include substrate 801 configured to receive support structure 802. Substrate 801 may be made from an electrically insulating material including, but is not limited to, a ceramic, a dielectric, glass, among other things. In some embodiments, substrate 801 may comprise a circuit board configured to receive support structure 802 and supporting electrical circuitry.

Charged-particle detection apparatus 800 may comprise support structure 802 configured as a BSE detector. In some embodiments, support structure 802 may include, but is not limited to, an electrostatic element, or a magnetic element of a charged-particle beam apparatus, such as a deflector, a deflection scanning unit, a portion of beam booster, a beam separator, among other things. For example, a deflector (e.g., deflector 309-1 or 309-2 of FIG. 3B) may be configured to deflect primary incident electron beam on the sample or detect signal electrons having high emission energy and medium emission polar angles. It is appreciated that although support structure 802 is illustrated having a circular cross-section, support structure 802 may have, but is not limited to, a hexagonal, rectangular, elliptical, etc. cross-section, as appropriate.

Charged-particle detection apparatus 800 may further include charged-particle detector 803 disposed on an inner surface of support structure 802. In some embodiments, disposing charged-particle detector 803 on support structure 802 may include, but is not limited to, depositing, coupling, fabricating, attaching, among other things, based on charged-particle detector 803 and its functions. Charged-particle detector 803 may be disposed circumferentially on the inner surface of support structure 802 to maximize the exposure to primary electrons or signal electrons.

In some embodiments, charged-particle detector 803 may comprise a diode, a scintillator, a radiation detector, a solid-state detector, a p-i-n junction diode, or a p-i-n detector, among other things. Charged-particle detector 803 may be configured to detect charged-particles including, but are not limited to, ionizing radiation, electrons, X-rays, photons, among other things. In some embodiments, charged-particle detector 803 may comprise a monolithic detector or a segmented detector. Although FIG. 8 illustrates four segments of charged-particle detector 803, it is appreciated that any number of segments may be used, as appropriate.

Charged-particle detection apparatus 800 may further include conducting layer 804 configured to deflect primary electrons of primary electron beam on the sample. Conducting layer 804 may be disposed on an inner surface of charged-particle detector 803. In some embodiments, conducting layer 804 may be disposed on a portion of the inner surface of charged-particle detector 803. In some embodiments, conducting layer 804 may be disposed on one or more segments of charged-particle detector 803 by techniques including, but are not limited to, depositing, coupling, fabricating, attaching, among other things. Conducting layer 804 may comprise a layer made of a material including, but is not limited to, an electrical conductor, a metal, a semiconductor, a doped semiconductor, an electrode, among other things. In some embodiments, conducting layer 804 may comprise a thin film of metal such as gold, platinum, palladium, silver, copper, aluminum, among other things. In some embodiments, support structure 802, charged-particle detector 803, or conducting layer 804 may be rotationally symmetric with primary optical axis (not illustrated, e.g., primary optical axis 304 of FIG. 3A).

As an example, charged-particle detection apparatus 800 may include support structure 802 supporting an electrostatic element such as deflector 309-1 or 309-2, charged-particle detector 803 configured to detect signal electrons including BSEs having high emission energy and medium emission polar angle and formed on an inner surface of deflector 309-1 or 309-2, or conducting layer 804 disposed on the inner surface of charged-particle detector 803. Such a configuration, while functioning as a deflector and a detector may also enhance BSE collection efficiency, and thereby enhancing imaging contrast and signal-to-noise ratio (SNR). Support structure 802 may be configured to provide mechanical support to system components and may not be configured to be electrically connected.

Charged-particle detection apparatus 800 may further include control circuitry to control operation of charged-particle detection apparatus 800 as a deflector and a detector. Control circuitry may include power bus 840 configured to distribute and manage power to components such as isolated power sources, generators, loads, feeders, among other things. Control circuitry may further include one or more power source(s) 820 configured to supply power to other system components including readout circuits 815, charged-particle detector 803, among other components.

In some embodiments, floating voltages may be applied to deflection scanning electrodes 810Y_1, 810_Y2, 810_X1, or 810_X2. In some embodiments, the absolute value of floating voltages of at least two deflection scanning electrodes may be different. The applied floating voltages may be the operating voltages of the deflection scanning electrodes. Each of the deflection scanning electrodes 810Y_1, 810_Y2, 810_X1, or 810_X2, may be configured to apply the deflection voltage to conducting layer 804.

In some embodiments, power source 820 may be configured to provide power to components or function blocks floated on the scan deflection voltage or beam booster voltage. For example, in a deflector-detector combination, the deflection voltage may be applied to a corresponding conducting layer 804 through one of deflection scanning electrodes and a deflection scanning driver (not shown), and in a beam booster-detector combination, the booster voltage may be applied to conducting layer 804 through a beam booster driver (not shown). The booster voltage applied to conducting layer 804 may comprise a static voltage, for example. In some embodiments, a scan deflection voltage signal may be applied to conducting layer 804 disposed on the inner surface of a segment of charged-particle detector 803 through deflection scanning electrodes 810Y_1, 810_Y2, 810_X1, or 810_X2 and scan signal wire 816. The scan deflection voltage signals may be configured to deflect the primary electron beam in X-, or Y-axis. In some embodiments, scan deflection voltage signals may be applied to deflect the primary electron beam in +X, −X, +Y, or −Y directions, as needed.

Control circuitry of charged-particle detection apparatus 800 may further comprise one or more readout circuit(s) 815 configured to receive detection signals from segments of charged-particle detector 803 and process data associated with the detection signals. The associated data may comprise imaging data, tool parameters, detection parameters, among other things. Detection signals may be transmitted from segments of charged-particle detector 803 to readout circuit 815 using image signal wire 817, for example In some embodiments, readout circuit 815 may be further configured to communicate information associated with detection signals from charged-particle detector 803 to a processor of charged-particle detection apparatus 800. The processor may comprise a computer, a server, a computer-implemented processor, among other things. The information associated with detection signals may be communicated with the processor using optical fiber signals, data links, wideband transformers, or wirelessly, among other things.

In some embodiments, readout circuit 815 may be powered by a corresponding power source 820 through connection 818. One or more power source(s) 820 may be configured to receive power from power bus 840 and supply power to circuit components including, but are not limited to, readout circuit(s) 815, charged-particle detector 803, among other things.

Figure 9:
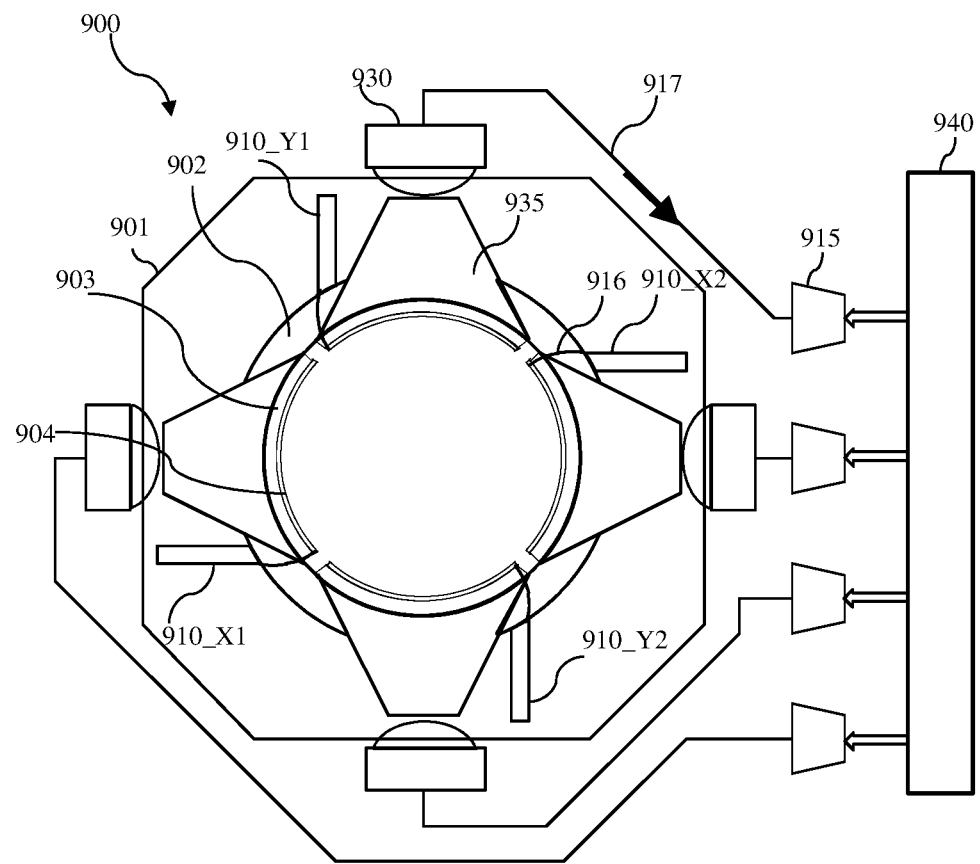
FIG. 9 is a schematic illustration of an exemplary configuration of a charged-particle detection apparatus, consistent with embodiments of the present disclosure.

Reference is now made to FIG. 9, which illustrates a plan view of charged-particle detection apparatus 900, consistent with embodiments of the present disclosure. Charged-particle detection apparatus 900 may comprise a substrate 901, a support structure 902, a charged-particle detector 903, a conducting layer 904, deflection scanning electrodes 910Y_1, 910_Y2, 910_X1, and 910_X2, a readout circuit 915, a scan signal wire 916, an image signal wire 917, and a power bus 940. It may be appreciated that other commonly known components of charged-particle detection apparatus 900 may be added, omitted, or modified, as appropriate. It is also appreciated that substrate 901, support structure 902, deflection scanning electrodes 910Y_1, 910_Y2, 910_X1, and 910_X2, and power bus 940 may be substantially similar to and perform substantially similar functions as substrate 801, support structure 802, deflection scanning electrodes 810Y_1, 810_Y2, 810_X1, and 810_X2, and power bus 840.

In some embodiments, charged-particle detector 903 may comprise a scintillator. Charged-particle detection apparatus 900 may comprise a photodetector 930 configured to detect photons emitted by scintillator along an optical path 935. In some embodiments, charged-particle detector 903 may comprise a secondary electron detector, a backscattered electron detector, an Everhart-Thornley detector, or the like.

Charged-particle detection apparatus 900 may further include conducting layer 904 configured to deflect primary electrons of primary electron beam on the sample. Conducting layer 904 may be disposed on an inner surface of charged-particle detector 903. In some embodiments, conducting layer 904 may be disposed on a portion of the inner surface of charged-particle detector 903. In some embodiments, conducting layer 904 may be disposed on one or more segments of charged-particle detector 903 by techniques including, but are not limited to, depositing, coupling, fabricating, attaching, among other things. Conducting layer 904 may comprise a layer made of a material including, but is not limited to, an electrical conductor, a metal, a semiconductor, a doped semiconductor, an electrode, among other things. In some embodiments, conducting layer 904 may comprise a thin film of metal such as gold, platinum, palladium, silver, copper, aluminum, among other conductive materials. In some embodiments, support structure 902, charged-particle detector 903, or conducting layer 904 may be rotationally symmetric with primary optical axis (not illustrated, e.g., primary optical axis 304 of FIG. 3A).

As an example, charged-particle detection apparatus 900 may include support structure 902 comprising an electrostatic element such as deflector 309-1 or 309-2, charged-particle detector 903 configured to detect signal electrons including BSEs having high emission energy and medium emission polar angle and formed on an inner surface of deflector 309-1 or 309-2, and conducting layer 904 disposed on the inner surface of charged-particle detector 903. Signal electrons generated from the probe spots on a sample may be directed towards charged-particle detector 903 (e.g., a scintillator). An electrical bias on the scintillator may attract signal electrons (including SEs and BSEs). The scintillator may be configured to convert the signal electrons to photons. The generated photons may be directed towards photodetector 930 along optical path 935. Such a configuration, while functioning as a deflector and a detector may also enhance BSE collection efficiency, thereby enhancing imaging contrast and SNR.

Charged-particle detection apparatus 900 may further include control circuitry to control operation of charged-particle detection apparatus 900 as a deflector and a detector. Control circuitry may include power bus 940 configured to distribute and manage power to components such as readout circuit 915. In some embodiments, power bus 940 may be configured to provide power to components or function blocks floated on the scan deflection voltage or beam booster voltage. For example, in a deflector-detector combination, the deflection voltage may be applied to a corresponding conducting layer 904 through one of deflection scanning electrodes and a deflection scanning driver (not shown), and in a beam booster-detector combination, the booster voltage may be applied to conducting layer 904 through a beam booster driver (not shown). The booster voltage applied to conducting layer 904 may comprise a static voltage, for example. In some embodiments, a scan deflection voltage signal may be applied to conducting layer 904 disposed on the inner surface of a segment of charged-particle detector 903 through one of deflection scanning electrodes 910Y_1, 910_Y2, 910_X1, and 910_X2 and scan signal wire 916. The scan deflection voltage signals may be configured to deflect the primary electron beam in X-, or Y-axis. In some embodiments, scan deflection voltage signals may be applied to deflect the primary electron beam in +X, −X, +Y, or −Y directions, as needed.

Control circuitry of charged-particle detection apparatus 900 may further comprise one or more readout circuit(s) 915 configured to receive detection signals from segments of charged-particle detector 903 and process data associated with the detection signals. The associated data may comprise imaging data, tool parameters, detection parameters, among other things. Detection signals may be transmitted from photodetector 930 to readout circuit 915 using image signal wire 917, for example In some embodiments, readout circuit 915 may be further configured to communicate information associated with detection signals from photodetector 930 to a processor of charged-particle detection apparatus 900. The processor may comprise a computer, a server, a computer-implemented processor, among other things. The information associated with detection signals may be communicated with the processor using optical fiber signals, data links, wideband transformers, or wirelessly, among other things.

Figure 10:
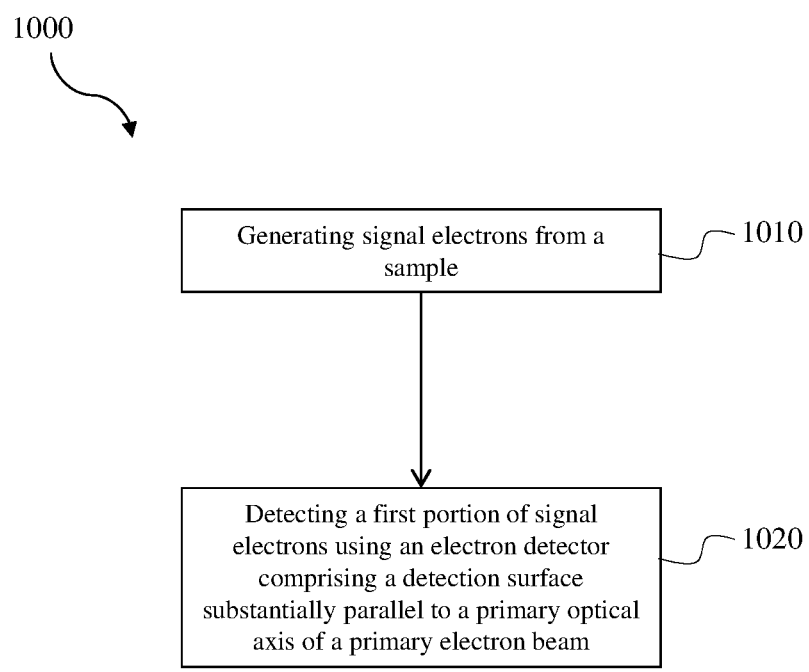
FIG. 10 is a process flowchart representing an exemplary method of forming an image of a sample using charged-particle beam apparatus of FIG. 4, consistent with embodiments of the present disclosure.

Reference is now made to FIG. 10, which illustrates a process flowchart representing an exemplary method 1000 of forming an image of a sample using charged-particle beam apparatus 40 of FIG. 4, consistent with embodiments of the present disclosure. Method 1000 may be performed by controller 50 of EBI system 100, as shown in FIG. 1, for example Controller 50 may be programmed to perform one or both steps of method 1000. For example, controller 50 may activate a charged-particle source, activate an optical system, and carry out other functions.

In step 1010, a charged particle source may be activated to generate a charged particle beam (e.g., primary electron beam 204 of FIG. 2). The electron source may be activated by a controller (e.g., controller 50 of FIG. 1). For example, the electron source may be controlled to emit primary electrons to form an electron beam along a primary optical axis (e.g., primary optical axis 201 of FIG. 2). The electron source may be activated remotely, for example, by using software, an application, or a set of instructions for a processor of a controller to power the electron source through a control circuitry.

The primary electron beam may be focused on the sample using an objective lens assembly (e.g., objective lens assembly 310 of FIG. 3A). In some embodiments, scanning deflection unit (e.g., scanning deflection unit 309 of FIG. 3A) may be configured to dynamically deflect the primary electron beam on surface of a sample (e.g., sample 308 of FIG. 3A). The dynamic deflection of primary electron beam may cause a desired area or a desired region of interest to be scanned, for example in a raster scan pattern, to generate SEs and BSEs for sample inspection. Scanning deflection unit may comprise one or more deflectors (e.g., deflector 309-1 or 309-2 of FIG. 3B) configured to deflect primary electron beam 302 in X-axis or Y-axis.

The focused primary electron beam upon interaction with the sample may generate signal electrons including, but are not limited to, secondary, backscattered, or auger electrons, among other things.

In step 1020, a portion of signal electrons having high emission energies and medium emission polar angles may be detected using a signal electron detector comprising an electron detection layer substantially parallel to the primary optical axis. Signal electron detector (e.g., signal electron detector 420 of FIG. 4) may be placed such that an electron detection layer (e.g., electron detection layer 421 of FIG. 4) may be substantially vertical relative to the plane of the sample. In some embodiments, the signal electron detector may be placed such that the electron detection layer may be substantially parallel to the primary optical axis. The electron detection layer may comprise or may be disposed on an inner surface of the signal electron detector.

The signal electron detector may be configured to detect a portion of signal electrons based on characteristics of the signal electrons. The characteristics may include, but are not limited to, emission energy, emission polar angle, emission azimuth angle, among other things. For example, the vertical signal electron detector may be configured to detect signal electrons having high emission energy (>50 eV) and a medium emission polar angle in the range of 15° to 65° relative to the primary optical axis. In some embodiments, based on the number of signal electron detectors used, they may be placed such that they are configured to detect signal electrons having a predefined range of emission polar angles. As an example, a signal electron detector may be configured to detect a portion of signal electrons having high emission energy and emission polar angle in the range of 15° to 40°, and another signal electron detector may be configured to detect a portion of signal electrons having high emission energy and emission polar angle in the range of 40° to 65°. It is appreciated that the number, position, and type of signal electron detectors may be adjusted, as appropriate. It is also appreciated that the emission polar angle ranges described herein are exemplary, and other ranges may be used.

The signal electron detector may be disposed between the objective lens assembly and an in-lens electron detector (e.g., in-lens electron detector 407 of FIG. 4). In some embodiments, the signal electron detector may be disposed between the sample and the in-lens electron detector. In some embodiments, more than one signal electron detectors may be disposed between the sample and the in-lens electron detector. The signal electron detector may comprise a monolithic electron detector, or a segmented electron detector. In a monolithic electron detector, the electron detection layer may comprise a non-segmented layer of charged-particle sensitive material. In a segmented electron detector, electron detection layer may comprise a discontinuous layer of charged-particle sensitive material, forming segments of the segmented electron detector. The segments of the segmented electron detector may be arranged in a two-dimensional (2D) or a three-dimensional (3D) arrangement around the primary optical axis. The segments of the segmented electron detector may be arranged linearly, radially, circumferentially, or azimuthally around the primary optical axis. The charged-particle sensitive material may be sensitive to charged particles such as ionizing radiation, electrons, X-rays, photons, among other things.

Figure 11:
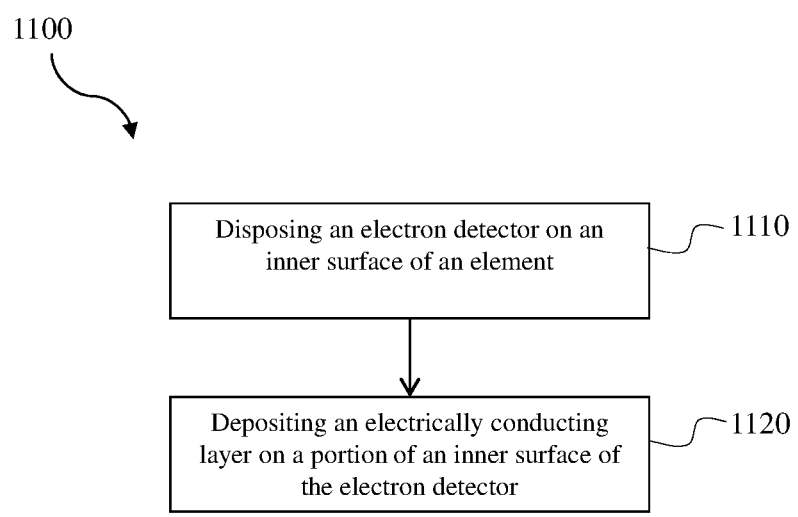
FIG. 11 is a process flowchart representing an exemplary method of configuring an electrostatic element of an electron beam apparatus, consistent with embodiments of the present disclosure.

Reference is now made to FIG. 11, which illustrates a process flowchart representing an exemplary method 1100 of configuring an electrostatic element of a charged-particle beam apparatus, consistent with embodiments of the present disclosure.

A charged particle source (e.g., electron source 201 of FIG. 2) may be activated to generate a charged particle beam (e.g., primary electron beam 202 of FIG. 2). The electron source may be activated by a controller (e.g., controller 50 of FIG. 1). For example, the electron source may be controlled to emit primary electrons to form an electron beam along a primary optical axis (e.g., primary optical axis 204 of FIG. 2). The electron source may be activated remotely, for example, by using software, an application, or a set of instructions for a processor of a controller to power the electron source through a control circuitry.

The primary electron beam may be focused on the sample using an objective lens assembly (e.g., objective lens assembly 310 of FIG. 3A). In some embodiments, scanning deflection unit (e.g., scanning deflection unit 309 of FIG. 3A) may be configured to dynamically deflect the primary electron beam on surface of a sample (e.g., sample 308 of FIG. 3A). The dynamic deflection of primary electron beam may cause a desired area or a desired region of interest to be scanned iteratively, for example in a raster scan pattern, to generate SEs and BSEs for sample inspection. Scanning deflection unit may comprise one or more deflectors (e.g., deflector 309-1 or 309-2 of FIG. 3B) configured to deflect primary electron beam 302 in X-axis or Y-axis. The focused primary electron beam upon interaction with the sample, may generate signal electrons including, but are not limited to, secondary, backscattered, or auger electrons, among other things.

An electrostatic component of the apparatus may be configured to detect signal electrons having high emission energies and medium emission polar angles, such as, BSEs generated from a probe spot on sample (e.g., sample 508 of FIG. 5) upon interaction with incident electrons of the primary electron beam. Electrostatic element (e.g., electrostatic element 520 of FIG. 5) may comprise a scanning deflection unit (e.g., scanning deflection unit 309 of FIGS. 3A and 3B), a beam booster, or a beam separator, among other things. The electrostatic element may be disposed between the sample and an in-lens electron detector (e.g., in-lens electron detector 507 of FIG. 5) along the primary optical axis. In some embodiments, the electrostatic element, the objective lens assembly, and the in-lens electron detector may be aligned with and be rotationally symmetric with the primary optical axis.

Configuring the electrostatic element to detect BSEs may comprise performing steps 1110 and 1120, as shown in FIG. 11. In step 1110, a charged-particle detector (e.g., charged-particle detector 903 of FIG. 9) may be disposed on an inner surface of the electrostatic element. The charged-particle detector may be configured to detect a first portion of a plurality of signal electrons generated upon interaction of the primary electron beam with the sample. The charged-particle detector may be disposed such that a charged-particle detection layer (e.g., electron detection layer 521 of FIG. 5) may be placed substantially parallel to the primary optical axis or substantially vertical with respect to the sample.

The charged-particle detector may be disposed circumferentially on the inner surface of the electrostatic element to maximize the exposure to primary electrons or signal electrons. The charged-particle detector may comprise a diode, a scintillator, a radiation detector, a solid-state detector, a p-i-n junction diode, or a p-i-n detector, among other things. The charged-particle detector may be configured to detect charged-particles including, but are not limited to, ionizing radiation, electrons, X-rays, photons, among other things. In some embodiments, charged-particle detector may comprise a monolithic detector or a segmented detector.

In step 1120, an electrically conducting layer (e.g., conducting layer 904 of FIG. 9) may be deposited on a portion of an inner surface of the charged-particle detector. The conducting layer may be configured to deflect primary electrons of primary electron beam on the sample. The conducting layer may be disposed on a portion of the inner surface of charged-particle detector by techniques including, but are not limited to, depositing, coupling, fabricating, attaching, among other things. The electrostatic element may be a beam booster, a beam deflector, deflection scanning unit, a beam separator, among other things.

Aspects of the present disclosure are set out in the following numbered clauses:

1. An electron beam apparatus comprising:
   an electron source configured to generate a primary electron beam along a primary optical axis; and
   a first electron detector having a first detection layer substantially parallel to the primary optical axis and configured to detect a first portion of a plurality of signal electrons generated from a probe spot formed by the primary electron beam on a sample.
2. The apparatus of clause 1, further comprising a second electron detector configured to detect a second portion of the plurality of signal electrons, wherein a second detection layer of the second electron detector is substantially perpendicular to the primary optical axis.
3. The apparatus of clause 2, further comprising an objective lens configured to:
   focus the primary electron beam on the sample;
   focus the first portion of the plurality of signal electrons on the first detection layer of the first electron detector; and
   focus the second portion of the plurality of signal electrons on the second detection layer of the second electron detector.
4. The apparatus of any one of clauses 2 and 3, wherein the first electron detector is disposed between the sample and the second electron detector, and is disposed along the primary optical axis.
5. The apparatus of any one of clauses 2-4, wherein the first and the second electron detectors are configured to detect the plurality of signal electrons generated from the probe spot on the sample.
6. The apparatus of any one of clauses 2-5, wherein the first electron detector comprises a secondary electron detector, a backscattered electron detector, an electrostatic element or a magnetic element.
7. The apparatus of clause 6, wherein the electrostatic element comprises a beam deflector or a beam booster, and wherein the magnetic element comprises a beam deflector or a beam separator.
8. The apparatus of any one of clauses 6 and 7, wherein the electrostatic element or the magnetic element comprises an inner surface configured to facilitate detection of the first portion of the plurality of signal electrons.
9. The apparatus of any one of clauses 7-8, wherein the beam deflector comprises an inner surface configured to facilitate detection of the first portion of the plurality of signal electrons.

10. The apparatus of clause 9, wherein the inner surface of the beam deflector comprises a continuous detection layer or a segmented detection layer.
11. The apparatus of clause 10, wherein the segmented detection layer of the beam deflector comprises a plurality of detector segments arranged linearly, radially, circumferentially, or azimuthally along the primary optical axis.
12. The apparatus of any one of clauses 7-11, wherein the beam deflector comprises a multipole structure, and an inner surface of a pole of the multipole structure is configured to facilitate detection of the first portion of the plurality of signal electrons.
13. The apparatus of any one of clauses 7-12, wherein the beam booster comprises an inner surface configured to facilitate detection of the first portion of the plurality of signal electrons.
14. The apparatus of clause 13, wherein the inner surface of the beam booster comprises a continuous detection layer or a segmented detection layer.
15. The apparatus of clause 14, wherein the segmented detection layer of the beam booster comprises a plurality of detector segments arranged linearly, radially, circumferentially, or azimuthally along the primary optical axis.
16. The apparatus of any one of clauses 7-15, wherein the beam separator comprises an inner surface configured to facilitate detection of the first portion of the plurality of signal electrons.
17. The apparatus of any one of clauses 1-16, wherein the first electron detector comprises a monolithic electron detector or a segmented electron detector.
18. The apparatus of clause 17, wherein the segmented electron detector comprises a plurality of detector segments arranged linearly, radially, circumferentially, or azimuthally along the primary optical axis.
19. The apparatus of any one of clauses 1-18, wherein the first electron detector comprises a plurality of electrostatic elements configured to detect the plurality of signal electrons based on a characteristic of a signal electron of the plurality of signal electrons.
20. The apparatus of clause 19, wherein the characteristic of the signal electron comprises an emission energy, an emission polar angle, or an emission azimuth angle of the signal electron with reference to the primary optical axis.
21. The apparatus of clause 20, wherein the first portion of the plurality of signal electrons comprises backscattered electrons, and wherein the emission polar angle of the backscattered electrons is in a range of 15° to 65°.
22. The apparatus of any one of clauses 1-21, wherein the plurality of signal electrons comprises secondary electrons, backscattered electrons, or auger electrons.
23. An electron beam apparatus comprising:
an element comprising:
a first electron detector having a first detection layer disposed on an inner surface of the element and configured to detect a first portion of a plurality of signal electrons generated after interaction of a primary electron beam with a sample; and
an electrically conducting layer deposited on a portion of an inner surface of the first electron detector and configured to deflect the primary electron beam on the sample.
24. The apparatus of clause 23, wherein the first electron detector comprises a diode, a scintillator, a radiation detector, a solid-state detector, or a p-i-n junction diode.
25. The apparatus of any one of clauses 23 and 24, wherein the electrically conducting layer comprises a metal film, a semiconductor film, or an electrode.
26. The apparatus of any one of clauses 23-25, further comprising a controller having circuitry configured to:
apply a voltage signal to the electrically conducting layer to deflect the primary electron beam; and
receive a detection signal generated by the first electron detector in response to the plurality of signal electrons being detected.
27. The apparatus of clause 26, wherein the detection signal comprises an electrical signal, an optical signal, a mechanical signal, or a combination thereof.
28. The apparatus of any one of clauses 26 and 27, wherein the applied voltage signal comprises a scan deflection voltage configured to scan the primary electron beam along an X-axis, a Y-axis, or both.
29. The apparatus of any one of clauses 26-28, wherein the circuitry comprises a readout circuit configured to communicate data associated with the detection signal to a processor of the electron beam apparatus.
30. The apparatus of any one of clauses 23-29, wherein the first electron detector comprises a plurality of segments of a segmented electron detector, and wherein the plurality of segments are arranged linearly, circumferentially, radially, or azimuthally along a primary optical axis of the primary electron beam.
31. The apparatus of clause 30, wherein the circuitry is further configured to individually apply the scan deflection voltage to the electrically conducting layer of a segment of the segmented electron detector and receive a corresponding detection signal
32. The apparatus of any one of clauses 23-31, further comprising a second electron detector having a second detection layer configured to detect a second portion of the plurality of signal electrons, wherein the second detection layer is substantially perpendicular to the primary optical axis.
33. The apparatus of clause 32, further comprising an objective lens configured to:
focus the primary electron beam on the sample; and
focus the first portion of the plurality of signal electrons on the first detection layer of the first electron detector; and
focus the second portion of the plurality of signal electrons on the second detection layer of the second electron detector.
34. The apparatus of any one of clauses 32 and 33, wherein the element is disposed between the sample and the second electron detector.
35. The apparatus of any one of clauses 32-34, wherein the first and the second electron detectors are configured to detect the plurality of signal electrons based on a characteristic of a signal electron of the plurality of signal electrons.
36. The apparatus of clause 35, wherein the characteristic of the signal electron comprises an emission energy, an emission polar angle, or an emission azimuth angle with reference to the primary optical axis.
37. The apparatus of clause 36, wherein the first portion of the plurality of signal electrons comprises backscattered electrons, and wherein the emission polar angle of the backscattered electrons is in a range of 15° to 65°.
38. The apparatus of any one of clauses 23-37, wherein the element comprises an electrostatic element or a magnetic element.

39. The apparatus of clause 38, wherein the electrostatic element comprises a beam deflector or a beam booster, and wherein the magnetic element comprises a beam deflector or a beam separator.
40. The apparatus of any one of clauses 39, wherein the beam deflector comprises an inner surface configured to facilitate detection of the first portion of the plurality of signal electrons.
41. The apparatus of clause 40, wherein the inner surface of the beam deflector comprises a continuous detection layer or a segmented detection layer.
42. The apparatus of clause 41, wherein the segmented detection layer of the beam deflector comprises a plurality of detector segments arranged linearly, radially, circumferentially, or azimuthally along the primary optical axis.
43. The apparatus of any one of clauses 39-42, wherein the beam deflector comprises a multipole structure, and an inner surface of a pole of the multipole structure is configured to facilitate detection of the first portion of the plurality of signal electrons.
44. The apparatus of any one of clauses 39-43, wherein the beam booster comprises an inner surface configured to facilitate detection of the first portion of the plurality of signal electrons.
45. The apparatus of clause 44, wherein the inner surface of the beam booster comprises a continuous detection layer or a segmented detection layer.
46. The apparatus of clause 45, wherein the segmented detection layer of the beam booster comprises a plurality of detector segments arranged linearly, radially, circumferentially, or azimuthally along the primary optical axis.
47. The apparatus of any one of clauses 39-46, wherein the beam separator comprises an inner surface configured to facilitate detection of the first portion of the plurality of signal electrons.
48. The apparatus of any one of clauses 23-47, wherein the plurality of signal electrons comprises secondary electrons, backscattered electrons, or auger electrons.
49. An element of an electron beam apparatus, the element comprising:
an electron detector having a detection layer configured to be, when installed in the electron beam apparatus, substantially parallel to a primary optical axis and configured to detect a first portion of a plurality of signal electrons generated after interaction of a primary electron beam with a sample; and
an electrically conducting layer disposed on a portion of the detection layer of the electron detector and configured to deflect the primary electron beam incident on the sample.
50. The element of clause 49, wherein the electron detector comprises a diode, a scintillator, a radiation detector, a solid-state detector, or a p-i-n junction diode.
51. The element of any one of clauses 49 and 50, wherein the electrically conducting layer comprises a metal film, a doped semiconductor film, or an electrode.
52. The element of any one of clauses 49-51, in electrical communication with a controller wherein:
the electrically conducting layer is applied a voltage signal from the controller to enable deflection of the primary electron beam; and
the charged-particle detector generates a detection signal in response to detection of the plurality of signal electrons.
53. The element of clause 52, wherein the detection signal comprises an electrical signal, an optical signal, a mechanical signal, or a combination thereof.
54. The element of any one of clauses 52 and 53, wherein the applied voltage signal comprises a scan deflection voltage configured to scan the primary electron beam along an X-axis, a Y-axis, or both.
55. The element of any one of clauses 49-54, wherein the electron detector comprises a plurality of segments of a segmented electron detector, and wherein the plurality of segments are arranged linearly, circumferentially, radially, or azimuthally along a primary optical axis of the primary electron beam.
56. The element of any one of clauses 49-55, wherein the electron detector is disposed on an inner surface of the element.
57. The element of any one of clauses 49-56, further comprising a beam deflector, wherein the beam deflector comprises an inner surface configured to facilitate detection of the first portion of the plurality of signal electrons.
58. The element of clause 57, wherein the inner surface of the beam deflector comprises a continuous detection layer or a segmented detection layer.
59. The element of clause 58, wherein the segmented detection layer of the beam deflector comprises a plurality of detector segments arranged linearly, radially, circumferentially, or azimuthally along the primary optical axis.
60. The element of any one of clauses 57-59, wherein the beam deflector comprises a multipole structure, and an inner surface of a pole of the multipole structure is configured to facilitate detection of the first portion of the plurality of signal electrons.
61. The element of any one of clauses 49-60, further comprising a beam booster, wherein the beam booster comprises an inner surface configured to facilitate detection of the first portion of the plurality of signal electrons.
62. The element of clause 61, wherein the inner surface of the beam booster comprises a continuous detection layer or a segmented detection layer.
63. The element of clause 62, wherein the segmented detection layer of the beam booster comprises a plurality of detector segments arranged linearly, radially, circumferentially, or azimuthally along the primary optical axis.
64. The element of any one of clauses 49-63, further comprising a beam separator, wherein the beam separator comprises an inner surface configured to facilitate detection of the first portion of the plurality of signal electrons.
65. The element of any one of clauses 49-64, wherein the plurality of signal electrons comprises secondary electrons, backscattered electrons, or auger electrons.
66. A method performed by an electron beam apparatus for observing a sample, the method comprising:
generating a plurality of signal electrons from a probe spot on the sample after interaction with a primary electron beam; and
detecting a first portion of the plurality of signal electrons using a first electron detector comprising a first detection layer substantially parallel to a primary optical axis of the primary electron beam.
67. The method of clause 66, further comprising detecting, using a second electron detector, a second portion of the plurality of signal electrons, wherein a second detection layer of the second electron detector is substantially perpendicular to the primary optical axis.

68. The method of any one of clauses 66 and 67, wherein the first electron detector comprises a secondary electron detector, a backscattered electron detector, an electrostatic element, or a magnetic element.

69. The method of any one of clauses 67-68, wherein the first electron detector is disposed between the sample and the second electron detector, and is disposed along the primary optical axis.

70. The method of any one of clauses 66-69, further comprising detecting the plurality of signal electrons based on a characteristic of a signal electron of the plurality of signal electrons.

71. The method of clause 70, wherein the characteristic of the signal electron comprises an emission energy, an emission polar angle, or an emission azimuth angle of the signal electron with reference to the primary optical axis.

72. The method of clause 71, wherein the first portion of the plurality of signal electrons comprises backscattered electrons, and wherein the emission polar angle of the backscattered electrons is in a range of 15° to 65°.

73. The method of any one of clauses 68-72, further comprising configuring an inner surface of the electrostatic element to facilitate detection of the first portion of the plurality of signal electrons.

74. The method of any one of clauses 68-73, wherein the electrostatic element comprises a beam deflector or a beam booster, and wherein the magnetic element comprises a beam deflector or a beam separator.

75. The method of clause 74, further comprising configuring an inner surface of the beam deflector to facilitate detection of the first portion of the plurality of signal electrons.

76. The method of clause 75, wherein the inner surface of the beam deflector comprises a continuous detection layer or a segmented detection layer.

77. The method of clause 76, wherein the segmented detection layer of the beam deflector comprises a plurality of detector segments arranged linearly, radially, circumferentially, or azimuthally along the primary optical axis.

78. The method of any one of clauses 74-77, further comprising configuring an inner surface of a pole of the beam deflector to facilitate detection of the first portion of the plurality of signal electrons.

79. The method of any one of clauses 74-78, further comprising configuring an inner surface of the beam booster to facilitate detection of the first portion of the plurality of signal electrons.

80. The method of any one of clauses 74-79, further comprising configuring an inner surface of the beam separator to facilitate detection of the first portion of the plurality of signal electrons.

81. A method of configuring an element of an electron beam apparatus, the method comprising:
disposing a first electron detector having a first detection layer on an inner surface of the element, the first electron detector configured to detect a first portion of a plurality of signal electrons generated after interaction of a primary electron beam with a sample; and
depositing an electrically conducting layer on a portion of an inner surface of the electron detector, the electrically conducting layer configured to deflect the primary electron beam on the sample.

82. The method of clause 81, wherein the electron detector comprises a diode, a scintillator, a radiation detector, a solid-state detector, or a p-i-n junction diode.

83. The method of any one of clauses 81 and 82, further comprising disposing a segmented electron detector comprising a plurality of segments, and wherein the plurality of segments are arranged linearly, circumferentially, radially, or azimuthally along a primary optical axis of the primary electron beam.

84. The method of any one of clauses 81-83, wherein disposing the first electron detector comprises forming the first electron detector using a technique comprising micro-electromechanical system (MEMS) fabrication, semiconductor fabrication, or mechanical coupling.

85. The method of any one of clauses 81-84, wherein depositing the electrically conducting layer is performed using a technique comprising bonding, gluing, soldering, physical vapor deposition, or chemical vapor deposition.

86. The method of any one of clauses 81-85, wherein the electrically conducting layer comprises a metal film, a semiconductor film, or an electrode.

87. The method of any one of clauses 81-86, further comprising electrically connecting the element with a controller configured to:
apply a voltage signal to the electrically conducting layer to enable deflection of the primary electron beam; and
receive a detection signal from the first electron detector in response to the plurality of signal electrons being detected by the first electron detector.

88. The method of clause 87, wherein applying the voltage signal comprises applying a scan deflection voltage signal configured to scan the primary electron beam along an X-axis, a Y-axis, or both.

89. The method of any one of clauses 81-88, wherein detecting the first portion of the plurality of signal electrons is based on a characteristic of a signal electron of the plurality of signal electrons, the characteristic of the signal electron comprising an emission energy, an emission polar angle, or an emission azimuth angle with reference to the primary optical axis.

90. The method of any one of clauses 81-89, further comprising disposing the first electron detector such that the first detection layer of the electron is placed substantially parallel to the primary optical axis.

91. The method of any one of clauses 81-90, wherein the element comprises an electrostatic element or a magnetic element.

92. The method of clause 91, wherein the electrostatic element comprises a beam deflector or a beam booster, and wherein the magnetic element comprises a beam deflector or a beam separator.

93. A non-transitory computer readable medium storing a set of instructions that is executable by one or more processors of an electron beam apparatus to cause the electron beam apparatus to perform a method of observing a sample, the method comprising:
generating a plurality of signal electrons from a probe spot on the sample after interaction with a primary electron beam; and
detecting a first portion of the plurality of signal electrons using a first electron detector comprising a first detection layer substantially parallel to a primary optical axis of the primary electron beam.

94. The non-transitory computer readable medium of clause 93, wherein the set of instructions that is executable by one or more processors of the electron beam apparatus causes the electron beam apparatus to further perform detecting, using a second electron detector, a second portion of the plurality of signal electrons, wherein a second detection layer of the second electron detector is substantially perpendicular to the primary optical axis.

95. The non-transitory computer readable medium of any one of clauses 93 and 94, wherein the set of instructions that is executable by one or more processors of the electron beam apparatus causes the electron beam apparatus to further perform detecting the plurality of signal electrons based on a characteristic of a signal electron of the plurality of signal electrons, the characteristic comprising an emission energy, an emission polar angle, or an emission azimuth angle of the signal electron with reference to the primary optical axis.

96. A charged-particle beam apparatus comprising:
a charged-particle source configured to generate a primary charged-particle beam along a primary optical axis; and
a first charged-particle detector having a first detection layer substantially parallel to the primary optical axis and configured to detect a first portion of a plurality of signal charged-particles generated from a probe spot formed by the primary charged-particle beam on a sample.

97. The apparatus of clause 96, further comprising a second charged-particle detector configured to detect a second portion of the plurality of signal charged-particles, wherein a second detection layer of the second charged-particle detector is substantially perpendicular to the primary optical axis.

98. The apparatus of clause 97, further comprising an objective lens configured to:
focus the primary charged-particle beam on the sample;
focus the first portion of the plurality of signal charged-particles on the first detection layer of the first charged-particle detector; and
focus the second portion of the plurality of signal charged-particles on the second detection layer of the second charged-particle detector.

99. The apparatus of any one of clauses 97 and 98, wherein the first charged-particle detector is disposed between the sample and the second charged-particle detector, and is disposed along the primary optical axis.

100. The apparatus of any one of clauses 97-99, wherein the first and the second charged-particle detectors are configured to detect the plurality of signal charged-particles generated from the probe spot on the sample.

101. The apparatus of any one of clauses 97-100, wherein the first charged-particle detector comprises a secondary electron detector, a backscattered electron detector, an electrostatic element or a magnetic element.

102. The apparatus of clause 101, wherein the electrostatic element comprises a beam deflector or a beam booster, and wherein the magnetic element comprises a beam deflector or a beam separator.

103. The apparatus of any one of clauses 101 and 102, wherein the electrostatic element or the magnetic element comprises an inner surface configured to facilitate detection of the first portion of the plurality of signal charged-particles.

104. The apparatus of any one of clauses 102-103, wherein the beam deflector comprises an inner surface configured to facilitate detection of the first portion of the plurality of signal charged-particles.

105. The apparatus of clause 104, wherein the inner surface of the beam deflector comprises a continuous detection layer or a segmented detection layer.

106. The apparatus of clause 105, wherein the segmented detection layer of the beam deflector comprises a plurality of detector segments arranged linearly, radially, circumferentially, or azimuthally along the primary optical axis.

107. The apparatus of any one of clauses 102-106, wherein the beam deflector comprises a multipole structure, and an inner surface of a pole of the multipole structure is configured to facilitate detection of the first portion of the plurality of signal charged-particles.

108. The apparatus of any one of clauses 102-107, wherein the beam booster comprises an inner surface configured to facilitate detection of the first portion of the plurality of signal charged-particles.

109. The apparatus of clause 108, wherein the inner surface of the beam booster comprises a continuous detection layer or a segmented detection layer.

110. The apparatus of clause 109, wherein the segmented detection layer of the beam booster comprises a plurality of detector segments arranged linearly, radially, circumferentially, or azimuthally along the primary optical axis.

111. The apparatus of any one of clauses 102-110, wherein the beam separator comprises an inner surface configured to facilitate detection of the first portion of the plurality of signal charged-particles.

112. The apparatus of any one of clauses 95-111, wherein the first electron detector comprises a monolithic electron detector or a segmented electron detector.

113. The apparatus of clause 112, wherein the segmented electron detector comprises a plurality of detector segments arranged linearly, radially, circumferentially, or azimuthally along the primary optical axis.

114. The apparatus of any one of clauses 95-113, wherein the first charged-particle detector comprises a plurality of electrostatic elements configured to detect the plurality of signal charged-particles based on a characteristic of a signal charged-particle of the plurality of signal charged-particles.

115. The apparatus of clause 114, wherein the characteristic of the signal charged-particle comprises an emission energy, an emission polar angle, or an emission azimuth angle of the signal charged-particle with reference to the primary optical axis.

116. The apparatus of clause 115, wherein the first portion of the plurality of signal charged-particles comprises backscattered electrons, and wherein the emission polar angle of the backscattered electrons is in a range of 15° to 65°.

117. The apparatus of any one of clauses 95-116, wherein the plurality of signal charged-particles comprises secondary electrons, backscattered electrons, or auger electrons.

A non-transitory computer readable medium may be provided that stores instructions for a processor of a controller (e.g., controller 50 of FIG. 1) to carry out image inspection, image acquisition, activating charged-particle source, adjusting electrical excitation of stigmators, adjusting landing energy of electrons, adjusting objective lens excitation, adjusting secondary electron detector position and orientation, stage motion control, beam separator excitation, applying scan deflection voltages to beam deflectors, receiving and processing data associated with signal information from electron detectors, configuring an electrostatic element, detecting signal electrons, etc. Common forms of non-transitory media include, for example, a floppy disk, a flexible disk, hard disk, solid state drive, magnetic tape, or any other magnetic data storage medium, a Compact Disc Read Only Memory (CD-ROM), any other optical data storage medium, any physical medium with patterns of holes, a Random Access Memory (RAM), a Programmable Read Only Memory (PROM), and Erasable Programmable Read Only Memory (EPROM), a FLASH-EPROM or any other flash memory, Non-Volatile Random Access Memory (NVRAM), a cache, a register, any other memory chip or cartridge, and networked versions of the same.

It will be appreciated that the embodiments of the present disclosure are not limited to the exact construction that has been described above and illustrated in the accompanying drawings, and that various modifications and changes may be made without departing from the scope thereof. The present disclosure has been described in connection with various embodiments, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The descriptions above are intended to be illustrative, not limiting. Thus, it will be apparent to one skilled in the art that modifications may be made as described without departing from the scope of the claims set out below.

The invention claimed is:

1. A method performed by an electron beam apparatus for observing a sample, the method comprising:
generating a plurality of signal electrons from a probe spot on the sample after interaction with a primary electron beam;
detecting a first portion of the plurality of signal electrons using a first electron detector comprising a first detection layer substantially parallel to a primary optical axis of the primary electron beam; and
detecting a second portion of the plurality of signal electrons using a second electron detector comprising a second detection layer substantially perpendicular to the primary optical axis,
wherein the first electron detector is positioned between the sample and the second electron detector.

2. An electron beam apparatus comprising:
an electron source configured to generate a primary electron beam along a primary optical axis;
a first electron detector having a first detection layer substantially parallel to the primary optical axis and configured to detect a first portion of a plurality of signal electrons generated from a probe spot formed by the primary electron beam on a sample; and
a second electron detector having a second detection layer substantially perpendicular to the primary optical axis and configured to detect a second portion of the plurality of signal electrons,
wherein the first electron detector is positioned between the sample and the second electron detector.

3. The apparatus of claim 2, further comprising an objective lens configured to:
focus the primary electron beam on the sample;
focus the first portion of the plurality of signal electrons on the first detection layer of the first electron detector; and
focus the second portion of the plurality of signal electrons on the second detection layer of the second electron detector.

4. The apparatus of claim 2, wherein the first and the second electron detectors are configured to detect the plurality of signal electrons generated from the probe spot on the sample.

5. The apparatus of claim 2, wherein the first electron detector comprises a secondary electron detector or a backscattered electron detector.

6. The apparatus of claim 2, wherein the first electron detector comprises a beam deflector.

7. The apparatus of claim 6, wherein the beam deflector comprises an inner surface configured to facilitate detection of the first portion of the plurality of signal electrons.

8. The apparatus of claim 7, wherein the inner surface of the beam deflector comprises a continuous detection layer or a segmented detection layer.

9. The apparatus of claim 8, wherein the segmented detection layer of the beam deflector comprises a plurality of detector segments arranged linearly, radially, circumferentially, or azimuthally along the primary optical axis.

10. The apparatus of claim 6, wherein the beam deflector comprises a multipole structure, and an inner surface of a pole of the multipole structure is configured to facilitate detection of the first portion of the plurality of signal electrons.

11. The apparatus of claim 6, wherein the first electron detector comprises an electrostatic element comprising the beam deflector and a beam booster that comprises an inner surface configured to facilitate detection of the first portion of the plurality of signal electrons.

12. The apparatus of claim 11, wherein the inner surface of the beam booster comprises a continuous detection layer or a segmented detection layer.

13. The apparatus of claim 12, wherein the segmented detection layer of the beam booster comprises a plurality of detector segments arranged linearly, radially, circumferentially, or azimuthally along the primary optical axis.

14. The apparatus of claim 2, wherein the first electron detector comprises an inner surface configured to facilitate detection of the first portion of the plurality of signal electrons.

15. The apparatus of claim 2, wherein the first electron detector comprises a monolithic electron detector or a segmented electron detector.

16. The apparatus of claim 15, wherein the segmented electron detector comprises a plurality of detector segments arranged linearly, radially, circumferentially, or azimuthally along the primary optical axis.

17. The apparatus of claim 2, wherein the first electron detector comprises a plurality of electrostatic elements configured to detect the plurality of signal electrons based on a characteristic of a signal electron of the plurality of signal electrons.

18. The apparatus of claim 2, wherein the first portion and the second portion of the plurality of signal electrons have different emission angles.

19. The apparatus of claim 2, wherein the first portion of the plurality of signal electrons comprises backscattered electrons, and wherein the second portion of the plurality of signal electrons comprises secondary electrons.

20. The apparatus of claim 2, wherein the first electron detector comprises an electrostatic element.

21. The apparatus of claim 20, wherein the electrostatic element comprises a beam deflector or a beam booster.

22. The apparatus of claim 20, wherein the electrostatic element comprises an inner surface configured to facilitate detection of the first portion of the plurality of signal electrons.

23. The apparatus of claim 2, wherein the first electron detector comprises a magnetic element.

24. The apparatus of claim 23, wherein the magnetic element comprises a beam deflector or a beam separator.

25. The apparatus of claim 24, wherein the beam separator comprises an inner surface configured to facilitate detection of the first portion of the plurality of signal electrons.

26. The apparatus of claim 23, wherein the magnetic element comprises an inner surface configured to facilitate detection of the first portion of the plurality of signal electrons.

* * * * *